(12) United States Patent
Hayasaki

(10) Patent No.: US 6,830,301 B2
(45) Date of Patent: Dec. 14, 2004

(54) PRINTHEAD, PRINTHEAD DRIVING METHOD, AND DATA OUTPUT APPARATUS

(75) Inventor: Kimiyuki Hayasaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 17 days.

(21) Appl. No.: 09/770,669

(22) Filed: Jan. 29, 2001

(65) Prior Publication Data

US 2001/0045967 A1 Nov. 29, 2001

(30) Foreign Application Priority Data

Jan. 31, 2000 (JP) .......................... 2000-022959

(51) Int. Cl.$^7$ .............................................. B41J 29/38
(52) U.S. Cl. ................... 347/9; 347/12; 347/10
(58) Field of Search ............................. 347/12, 9, 10, 347/145, 180, 182; 400/120.05, 120.06

(56) References Cited

U.S. PATENT DOCUMENTS

| | | | | |
|---|---|---|---|---|
| 4,313,124 A | | 1/1982 | Hara ........................... 346/140 |
| 4,345,262 A | | 8/1982 | Shirato et al. ............... 346/140 |
| 4,455,578 A | * | 6/1984 | Fearnside ................... 358/302 |
| 4,459,600 A | | 7/1984 | Sato et al. ................... 346/140 |
| 4,463,359 A | | 7/1984 | Ayata et al. ................. 346/1.1 |
| 4,558,333 A | | 12/1985 | Sugitani et al. ............. 346/140 |
| 4,608,577 A | | 8/1986 | Hori ........................... 346/140 |
| 4,649,401 A | * | 3/1987 | Kojima et al. ................ 346/76 |
| 4,723,129 A | | 2/1988 | Endo et al. ................... 346/1.1 |
| 4,740,796 A | | 4/1988 | Endo et al. ................... 346/1.1 |
| 5,173,717 A | | 12/1992 | Kishida et al. ............... 346/1.1 |
| 5,327,165 A | * | 7/1994 | Elliott ........................... 346/76 |
| 5,519,416 A | | 5/1996 | Hayasaki et al. ............. 347/12 |
| 5,625,399 A | * | 4/1997 | Wiklof et al. ................ 347/195 |
| 5,646,660 A | * | 7/1997 | Murray ......................... 347/59 |
| 5,907,331 A | * | 5/1999 | Markham ...................... 347/12 |
| 5,926,201 A | * | 7/1999 | Fleming et al. .............. 347/237 |
| 6,102,510 A | | 8/2000 | Kikuta et al. ................... 347/9 |
| 6,172,701 B1 | * | 1/2001 | Tokura et al. ............... 347/237 |

FOREIGN PATENT DOCUMENTS

| | | |
|---|---|---|
| DE | 100 59 573 | 5/2001 |
| EP | 0 551 013 | 7/1993 |
| EP | 0 602 582 | 6/1994 |
| EP | 0 678 386 | 10/1995 |
| EP | 0 713 191 | 5/1996 |
| EP | 0 822 073 | 2/1998 |
| GB | 2 356 955 | 6/2001 |
| JP | 54-56847 | 5/1979 |
| JP | 59-123670 | 7/1984 |
| JP | 59-138461 | 8/1984 |
| JP | 60-71260 | 4/1985 |
| JP | 1-232072 | 9/1989 |
| JP | 8-108550 | 4/1996 |

* cited by examiner

Primary Examiner—Hai Pham
Assistant Examiner—Lam Nguyen
(74) Attorney, Agent, or Firm—Fitzpatrick, Cella, Harper & Scinto

(57) ABSTRACT

The disclosed printhead can speed up transfer of image data and driving of printing elements without increasing the number of signal lines and connection terminals. An image data signal supplied to the printhead has a 4-bit bus format containing block selection data in its head. This signal is separated by a selection signal, and only the block selection data contained in the head is held in a latch and supplied to a decoder. The 4-bit image data corresponding to the four subsequent segments are respectively held in the four latches of a first printing control unit.

33 Claims, 21 Drawing Sheets

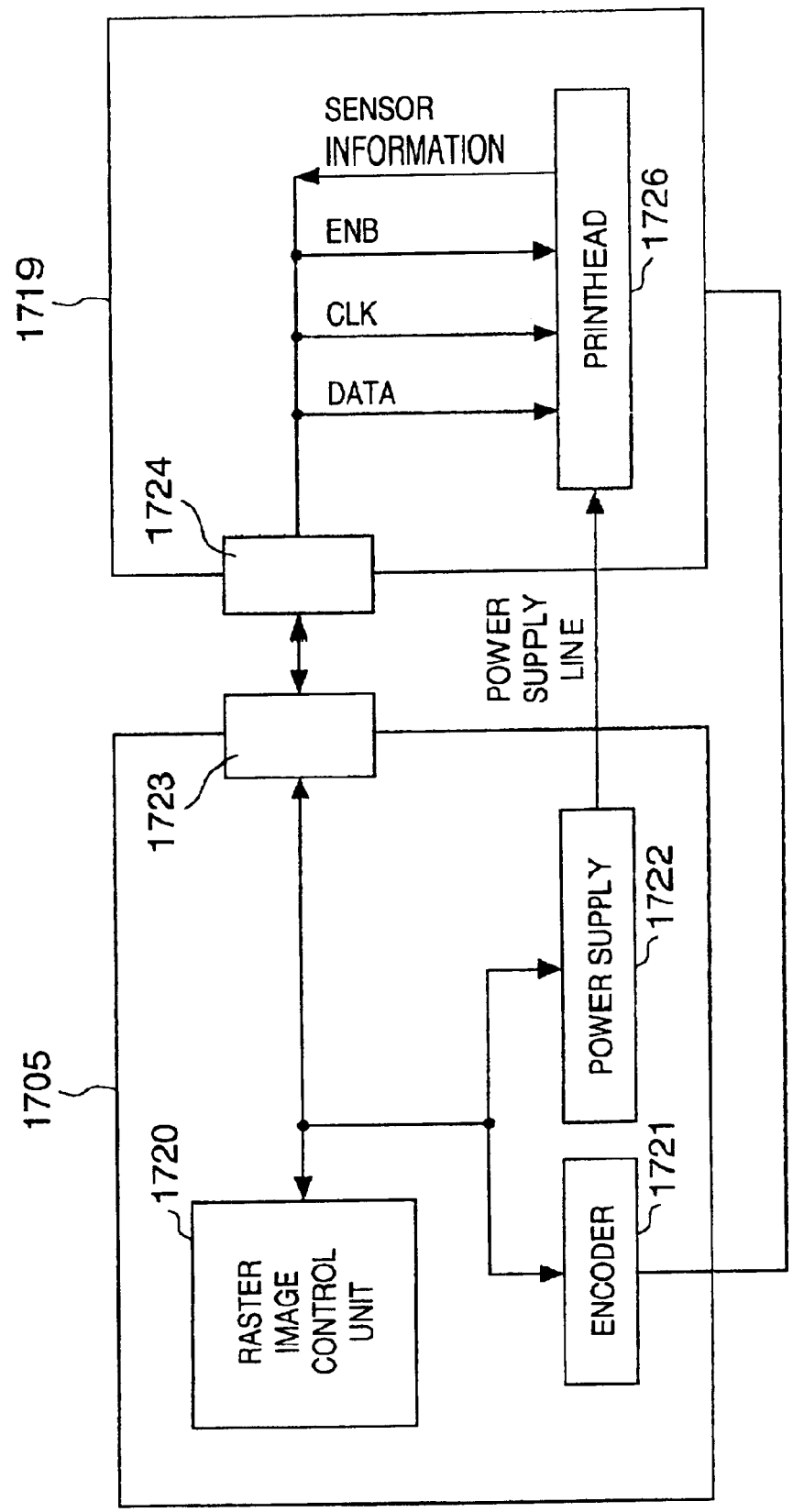

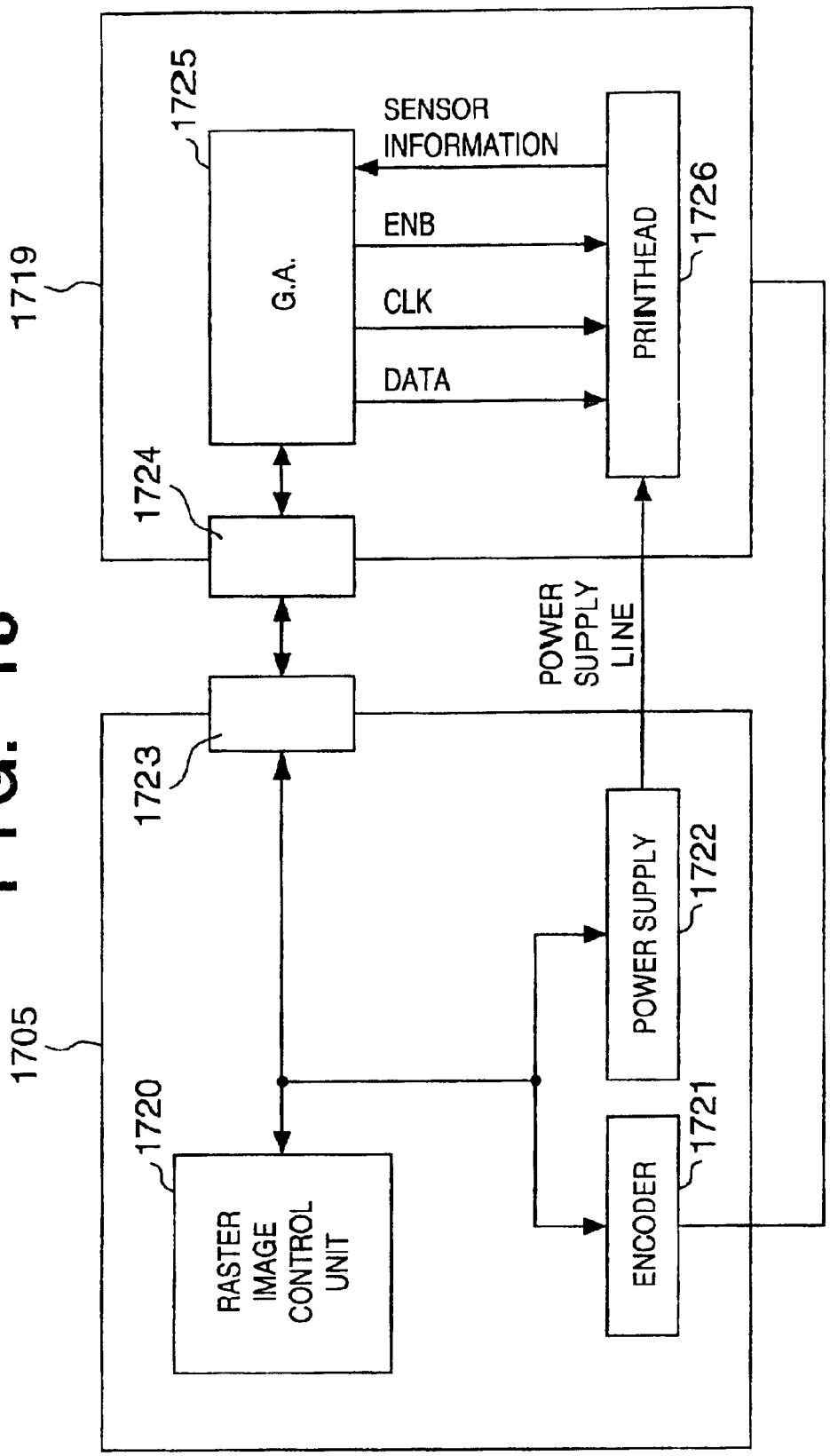

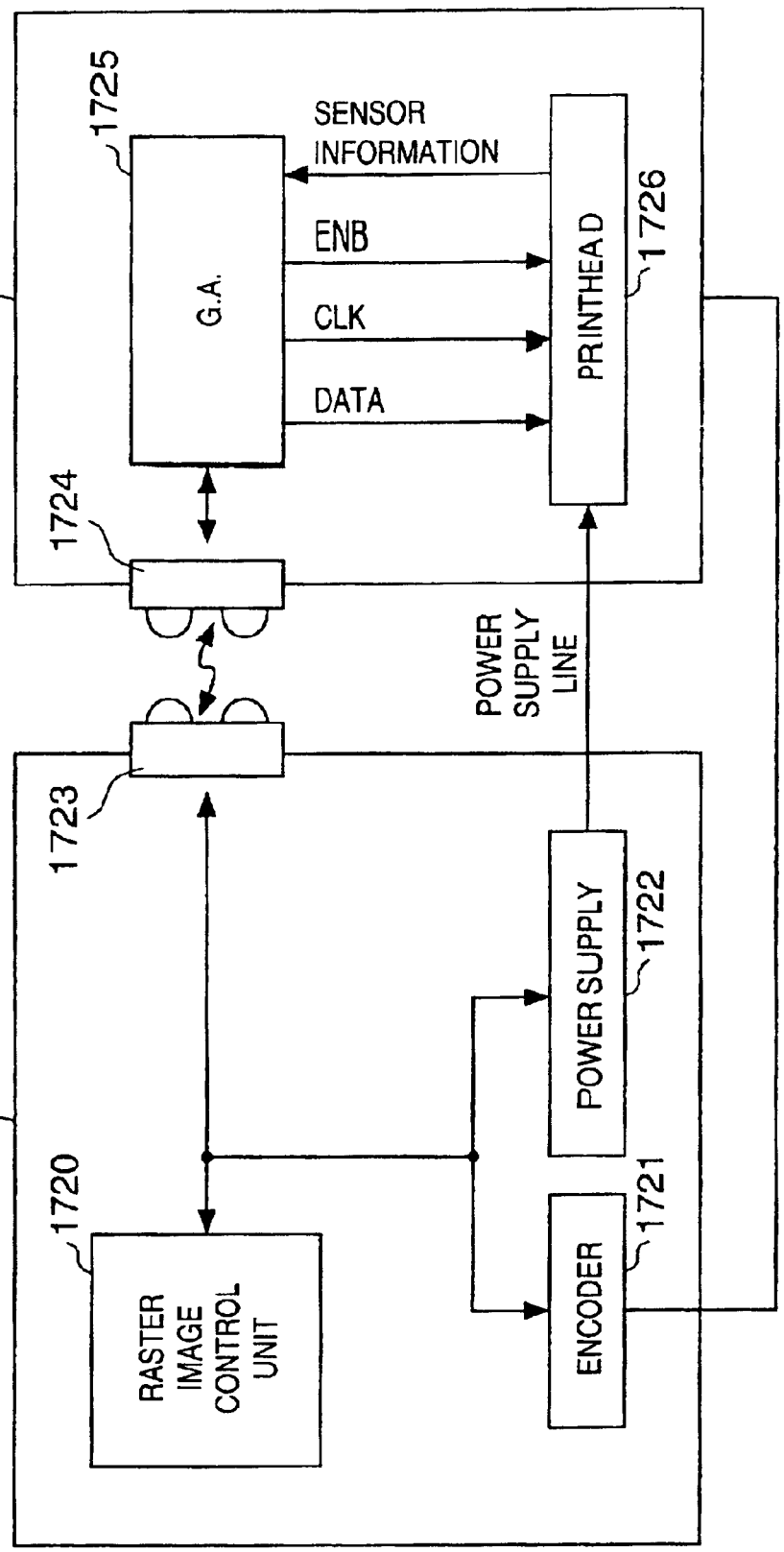

PRINTHEAD, PRINTHEAD DRIVING METHOD, AND DATA OUTPUT APPARATUS

FIELD OF THE INVENTION

The present invention relates to a printhead, printhead driving method, and data output apparatus and, more particularly, to a printhead which selects a block consisting of a plurality of printing elements that can be simultaneously driven and selectively drives the respective printing elements in accordance with image data, a printhead driving method, and a data output apparatus.

BACKGROUND OF THE INVENTION

As information output apparatuses in wordprocessors, personal computers, facsimiles, and the like, printing apparatuses for printing information such as desired characters and images on sheet-like printing media such as paper sheets and films are widely used.

These printing apparatuses are currently used as printers in business offices, clerical work departments, and personal use. Along with strong demands for higher density and higher printing speed, developments and improvements of printing apparatuses have been made to achieve further cost down, higher resolution, and the like.

Of printing apparatuses, an ink-jet printing apparatus designed to perform low-noise, non-impact printing to print images by discharging ink from orifices arranged in printing elements is capable of performing high-density, high-speed printing and widely used as a low-cost color printer owing to its structural feature.

A typical ink-jet printing apparatus is adapted to print an image by discharging ink in accordance with desired printing information using a printhead including printing elements (nozzles) each having an orifice and an electrothermal transducer for generating discharging energy for discharging ink from the orifice.

Conventionally, various types of printheads having a plurality of printing elements arrayed in a line are known. A printhead of this type can arbitrarily print images on a printing material (printing medium) such as paper by having several or several ten driving integrated circuits, each capable of simultaneously driving N printing elements as one block, mounted on a single substrate and arraying image data in correspondence with the respective printing elements.

In such a printhead, as the number of printing elements to be simultaneously driven increases, the power required for driving increases, posing problems in terms of the capacity of a power supply circuit and cost. In addition, when printing elements designed to perform printing by using heat are used, if one printing element is continuously driven, heat is accumulated. As a consequence, the printing density may change or the printing element itself may be destroyed.

Each printing element is also affected by heat from adjacent printing elements. For example, in an ink-jet printing apparatus, when adjacent printing elements are simultaneously driven, the respective nozzles are interfered with each other by mutual pressures produced in discharging ink. In some case, the printing density changes due to this pressure interference (crosstalk). For this reason, a halt period is preferably set after driving of printing elements so as to dissipate heat to a certain degree or avoid crosstalk.

As a driving method that can cope with the above problems and requirements, a method of grouping the printing elements into a plurality of blocks and time-divisionally driving the printing elements in units of blocks is known. In addition, a distributed driving method is known, in which printing elements to be simultaneously driven are distributed in the array direction such that adjacent printing elements belong to different blocks.

According to this driving method, since adjacent printing elements are not simultaneously driven, the influences of adjacent printing elements can be eliminated by setting a halt period.

FIG. 14 is a circuit diagram showing a specific example of a circuit arrangement for time-divisionally driving printing elements, in units of blocks, which perform printing by using heat. FIG. 15 is a timing chart of signals input to the circuit in FIG. 14.

Referring to FIG. 1, reference numeral 1 denotes an electrothermal transducer such as a heater provided for each printing element; 2, a functional element such as a transistor or FET for controlling the energization state of each electrothermal transducer; 3, an AND circuit for outputting a control signal for each functional element; 5, a decoder; 9, a power supply line; 10, a ground line; 13, a shift register, and 14, a latch. Reference symbol CLK denotes a clock signal; DATA, an image data signal; LAT, a latch pulse; BENB, a block selection signal; and ENB, a driving pulse signal.

When the image data signal DATA is input, image data are sequentially transferred to the shift register 13 by the image data transfer clock CLK and arrayed in the latch 14 in correspondence with the respective printing elements. Time-divisional driving can be performed by sequentially activating the block selection signals BENB within a period of the latch pulse signal LAT. In this case, if the block selection signals BENB are distributedly connected to printing elements, distributed driving is performed.

In addition, a printing apparatus having various printing modes uses a method of changing the pattern of the block selection signals BENB to be input to the decoder 5 within a period of the latch pulse signal LAT in accordance with a printing mode. In this case, printing elements can be driven in various patterns by combining other control signals.

In the printing apparatus using the above printhead, however, in order to increase the printing speed or printing density, the number of printing elements arranged in the printhead increases, and the density of printing elements also increases. For this reason, the number of blocks in the above time-divisional driving method increases, and the number of control signal lines increases even with the use of decoder circuits and the like. This tendency is typical when the driving pattern is changed in accordance with a printing mode.

To increase the printing speed, the transfer clocks for image data are also speeded up. This is because image data corresponding to all the printing elements on the printhead must be transferred within a period of a latch pulse.

A printhead circuit like the one described above is often manufactured as one chip-like heater board (H. B.) by using a semiconductor manufacturing process. If, however, the transfer clock for image data is set to 10 MHz or more, the buffer size in the integrated circuit increases owing to high-speed transfer, although it depends on the semiconductor design rule.

For example, in the circuit arrangement shown in FIG. 14, the number of shift registers and latch circuits corresponding to the respective printing elements becomes enormous. As a consequence, the cost of the printhead incorporating this circuit increases. A method of simply setting a plurality of input lines for image data is known. In this case, however, since data are serially transferred at a high frequency, problems associated with the connection between the printhead and the printing apparatus and an increase in driving current and secondary problems associated with radiation noise and the like arise.

In serial scan type printing apparatuses for general personal use as well, printheads having a print width of 1 inch become increasingly popular than those having a print with of 0.5 inches. In, for example, a printhead with 300 nozzles/inch, if it takes 0.1 $\mu$s (10 MHz) per pixel, a time t required to transfer 1-line image data for the printhead is given by $t=0.1\times300=30\ [\mu sec]$ As is obvious from the timing chart of FIG. 15, this time greatly influences the driving period of each printing element. To drive each printing element at a high speed, the period until the start of image data transfer of the next line must be shorter than the above time. For this purpose, a technique of shifting data at both the leading edge and trailing edge of a clock is implemented. In this case as well, image data must be transferred to the printhead at a high speed.

For a printhead with 600 nozzles/inch, for example, to cope with this problem, the driving speed of each printing element is decreased in inverse proportion to an increase in the number of printing elements.

As another method of increasing the driving speed, a method of dividing a printing element array into a plurality of portions, and using a plurality of input lines for image data is available. This method is implemented for an elongated printhead of a full-line type and the like. However, several to ten-odd image data input lines must be prepared in accordance with the number of nozzles of the printhead. With this arrangement, driving circuits with different specifications must be designed again for the respective printheads with different specifications.

In performing multi-grayscale printing, feedback control for a temperature sensor or the like is performed, and complicated driving control is performed to, for example, increase the pulse width for energization of each printing element or continuously applying double pulses or short pulses. In this case as well, the number of signal lines for driving printing elements increases.

If the number of signal lines increases in this manner, the number of connection terminals between the printhead and the printing apparatus body increases, causing various problems. For example, the cost of the connector portions of the printhead and apparatus body increases, and contact failures occur at connection portions. In an ink-jet printing apparatus, an operation error may be caused when ink adheres to the connector portions.

An arrangement in which a plurality of printing elements are assigned to each pixel to achieve high resolution is also known. In this case as well, it is inevitable that the number of control signals for driving the respective printing elements and the circuit size will increase.

SUMMARY OF THE INVENTION

It is an object of the present invention to provide a printhead which can speed up transfer of image data and driving of printing elements without increasing the number of signal lines and connection terminals and a printing apparatus using the printhead.

It is another object of the present invention to provide a data output apparatus suited to supplying data to the above printhead.

In order to achieve the above objects, a printhead according to the first aspect of the present invention comprises a plurality of printing elements for printing, a block selection circuit for outputting a selection signal for selecting a block of a plurality of printing elements that can be simultaneously driven, a printing control circuit for outputting a driving signal for selectively driving the printing elements, together with the selection signal, to each of the printing elements in correspondence with image data, and input means for receiving external image data to be input to the printing control circuit, wherein the input means is adapted to receive the image data and block selection data input to the block selection circuit in a bus format of a plurality of consecutive bits.

In addition, in order to achieve the above objects, a printhead according to the second aspect of the present invention comprises a plurality of printing elements for printing, a block selection circuit for outputting a selection signal for selecting a block of a plurality of printing elements that can be simultaneously driven, a printing control circuit for outputting a driving signal for selectively driving the printing elements, together with the selection signal, to each of the printing elements in correspondence with image data, and input means for receiving external image data to be input to the printing control circuit, wherein the input means is adapted to receive the image data in a bus format of a plurality of bits.

Furthermore, in order to achieve the above objects, a printhead according to the third aspect of the present invention comprises a plurality of printing elements for printing, a block selection circuit for outputting a selection signal for selecting a block of a plurality of printing elements that can be simultaneously driven, a printing control circuit for outputting a driving signal for selectively driving the printing elements, together with the selection signal, to each of the printing elements in correspondence with image data, and input means for receiving external image data to be input to the printing control circuit, wherein the input means is adapted to receive data associated with a printing element driving timing continuously with the image data.

According to the printhead having the above arrangement, the circuit arrangement can be simplified as compared with the prior art, and transfer of image data, control signals, and the like from the printing apparatus body can be speeded up with a smaller number of signal lines. In addition, since the number of contacts such as connector portions of the printhead is decreased, the cost of connectors and the connection failures are reduced, resulting in an improvement in reliability.

Furthermore, a printhead capable of high-density, high-speed printing can be provided by increasing the number of printing elements or arraying printing elements in various patterns without changing the size and cost of the printhead.

If a printing apparatus includes the printhead of the present invention, a color printer capable of high-density, high-speed printing can be implemented at a low cost.

Still another object of the present invention can be achieved by a driving method for the above printhead.

Still another object of the present invention can be achieved by a data output apparatus for outputting data corresponding to the printhead described above.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 17 is a block diagram showing the first arrangement example of the printhead control portion of the printing apparatus using the printhead of the present invention;

FIG. 18 is a block diagram showing the second arrangement example of the printhead control portion of the printing apparatus using the printhead of the present invention;

FIG. 19 is a block diagram showing the third arrangement example of the printhead control portion of the printing apparatus using the printhead of the present invention;

DETAILED DESCRIPTION OF THE PREFERRED EMBODIMENTS

Preferred embodiments of the present invention will now be described in detail in accordance with the accompanying drawings. Each embodiment exemplifies a printhead designed to perform printing by using heat energy. Converting a plurality of binary data into multilevel data that can be transmitted over a signal line such as a bus will be referred to as "coding" hereinafter.

[First Embodiment]

Figure 1:
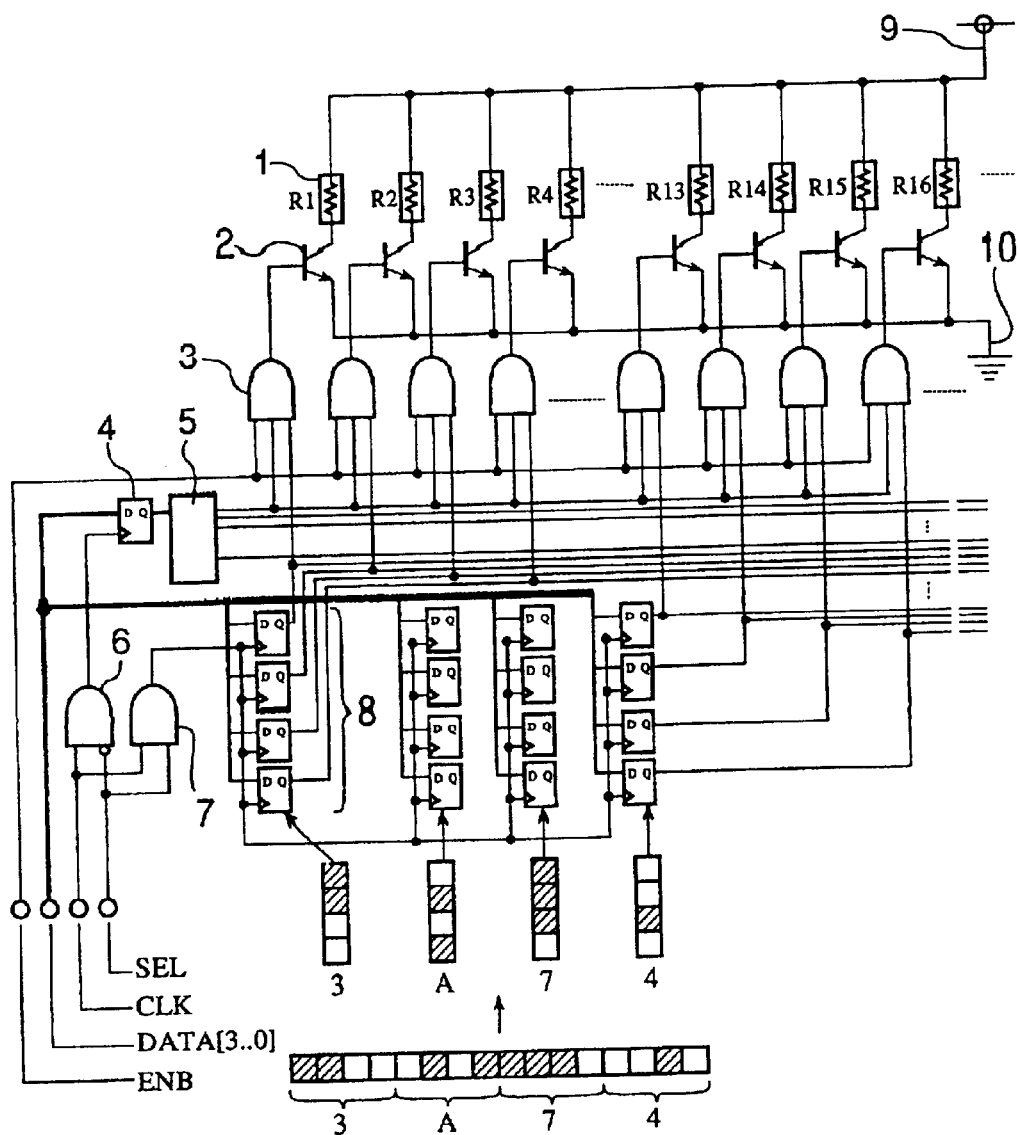
FIG. 1 is a block diagram showing the circuit arrangement of a printhead according to the first embodiment of the present invention.

FIG. 1 is a block diagram showing the basic circuit arrangement of a printhead according to the first embodiment of the present invention. Referring to FIG. 1, reference numeral 1 denotes a printing element including an electrothermal transducer. Basically, in this embodiment, printing elements are one-dimensionally arranged; they are arrayed in a predetermined direction throughout the print width, as shown in FIG. 1.

Reference numeral 2 denotes a driver for driving a printing element. Each driver 2 is connected to a corresponding electrothermal transducer. Referring to FIG. 1, each driver 2 is indicated by the electrical symbol of a transistor. However, another element such as an FET can be used as long as it is a functional element for controlling a conductive state. Reference numeral 3 denotes an AND circuit which determines a driving condition for a corresponding printing element and is provided for each printing element; 4, a latch circuit; 5, a decoder; 6 and 7, AND circuits; 9, a power supply line; and 10, a ground line.

A combination of one printing element 1, one driver 2, and one AND circuit 3 will be referred to as a segment hereinafter. A portion 8 constituted by a plurality of latches will be referred to as the first printing control unit, and a portion constituted by the latch circuit 4 and decoder 5 will be referred to as the second printing control unit.

Four types of signals, namely a clock signal CLK, driving pulse signal ENB, selection signal SEL, and image data signal DATA, are input to the circuit of this embodiment. In this embodiment, the image data signal DATA is supplied in a 4-bit bus format, and block selection data is continuously contained in the head of image data. The image data signal DATA is separated by the selection signal SEL; the data for block selection is supplied to the decoder 5, and the image data is supplied to each first printing control unit. In this embodiment, image data and block selection data exemplify the data in a 4-bit bus format as a multi-bit bus format. However, the present invention is not limited to this, and an 8-bit bus format or the like may be used.

In this embodiment, image data and data for block selection are continuously supplied. The word "continuously" used in each embodiment of the present invention includes not only a case where data are directly continuous with each other but also a case where data are serially transferred in a single signal line even if a non-signal period or other data strings are interposed between data.

That is, only the block selection data contained in the head of the image data signal DATA is held by the latch circuit 4 and supplied to the decoder 5. Four-bit image data corresponding to the four subsequent segments are respectively held in the four latches of the first printing control unit 8. In this manner, the first printing control unit 8 serves as a shift register whose data can be updated for each block.

In this case, since the image data signal DATA has a 4-bit bus format, 16 driven blocks can be set at maximum. FIG. 1 shows only a circuit for 16 segments corresponding to the first block. The printhead of this embodiment is therefore adapted to control 256 printing elements at maximum.

Each printing control unit can be arbitrarily set in the individual selection mode or block selection mode. In addition, selected printing elements can be arbitrarily arranged; they may be arrayed in conformity with an image process in the printing apparatus. By increasing the number of decoder blocks or the number of shift registers in each driven block, more than 256 printing elements can be driven.

The AND circuits 6 and 7 serve to branch a clock line. If the allocation of shift registers and data is determined, these circuits need not be used. As will be described later, an input to this branch circuit can also be used as a latch signal for a shift register.

Figure 2:
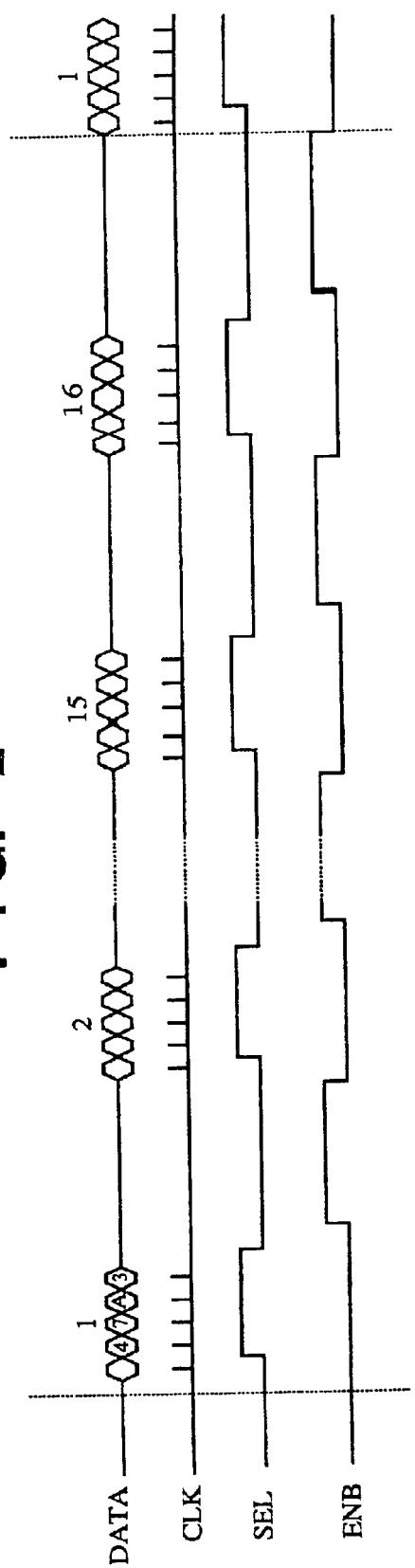
FIG. 2 is a timing chart showing the state of each signal in the circuit in FIG. 1.

FIG. 2 is a timing chart showing the state of each signal in the circuit block of FIG. 1. The operation of the circuit in FIG. 1 will be described below with reference to this timing chart.

Assume that in the circuit shown in FIG. 1, each first printing control unit decodes 4-bit parallel data from the image data signal DATA input in the 4-bit bus format into a base-16 signal (hexadecimal number), whereas each second printing control unit decodes four binary data into base-16 signals (hexadecimal numbers).

In this embodiment, first of all, block selection data for the second printing control unit is input to image data signal DATA [3..0] terminals and latched by CLK. At this time, the selection signal SEL is OFF, and hence the block selection data is held in the decoder 5.

The selection signal SEL is then enabled to perform switching to input a clock to each first printing control unit. Image data encoded into hexadecimal numbers in units of four bits, e.g., "4", "7", "A", and "3", are sequentially input to the first printing control units and shifted by synchronous clock signals CLK. When the four clock signals CLK are input, the data representing "4", "7", "A", and "3" in hexadecimal notation are sequentially latched in the four first printing control units from the right, as shown in FIG. 1.

While the block selection data and the image data of the corresponding blocks are latched in the first and second printing control units, the driving pulse signal ENB is made active until the next clock signal CLK is input. With this operation, the 16 printing elements 1 from R1 to R16 are simultaneously driven in accordance with the corresponding image data.

This processing is repeated for the 16 blocks to drive the 256 printing elements.

According to this embodiment described above, since the number of shift registers can be decreased with respect to the total number of printing elements, the circuit arrangement can be simplified, and the number of components can be reduced.

In addition, since the arrangement of the driving circuit can be simplified, the driving circuit can be formed by a semiconductor manufacturing process on the same substrate as the substrate on which printing elements and the like are arranged. This makes it possible to attain reduction in the size and cost of a printhead while maintaining its functions.

Furthermore, in transmitting/receiving data between the printhead and the printing apparatus body, the number of connection terminals can be decreased, and an increase in the number of printing elements can be handled without changing the number of terminals. If, therefore, the printhead of this embodiment is mounted in a printing apparatus, control on the printhead on the apparatus body side can be simplified.

[Second Embodiment]

Figure 3:
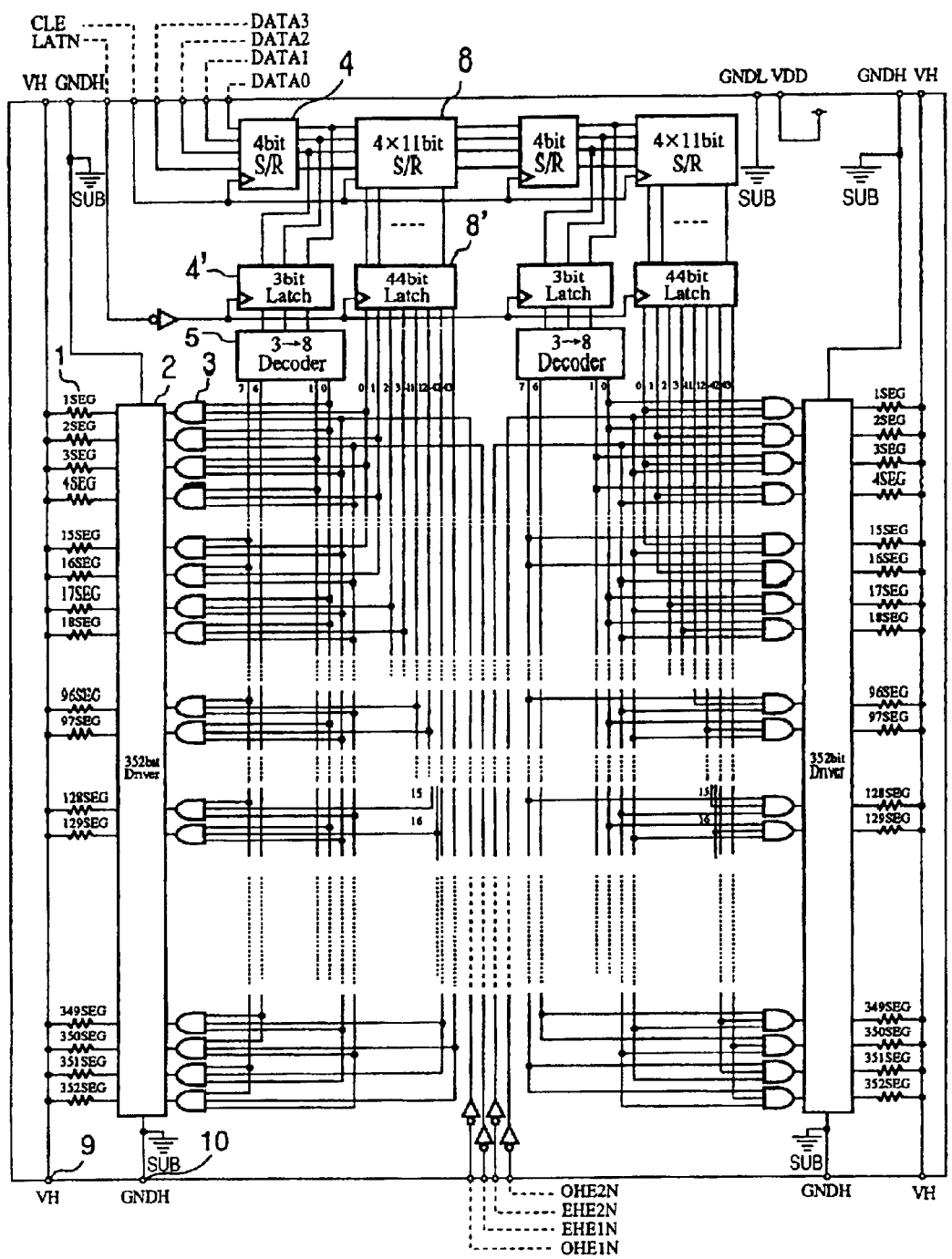
FIG. 3 is a block diagram showing the circuit arrangement of a printhead according to the second embodiment of the present invention.

A printhead according to the second embodiment of the present invention will be described below. FIG. 3 is a circuit diagram showing the arrangement of the printhead according to the second embodiment of the present invention. The same reference numerals as in the first embodiment denote the same parts in the second embodiment, and a detailed description thereof will be omitted.

In this embodiment, the arrangements of printing elements and functional elements for driving them are the same as those in the first embodiment, but the layout of printing elements and block arrangement are designed to drive more printing elements without increasing the number of signal lines. The printhead of this embodiment has 352 printing elements×2 rows, i.e., a total of 704 printing elements, and can drive the printing elements in the respective rows under different conditions.

More specifically, the printing elements in one row are grouped into eight blocks, and codes 0 to 8 are assigned to the respective blocks. Odd- and even-numbered printing elements are respectively driven at different timings in accordance with image data corresponding to the 44 printing elements belonging to a block corresponding to each code.

The printhead includes, for each of two rows, an arrangement comprised of 352 printing elements 1, a driver block 2 for driving the printing elements in one row, AND circuits 3 for determining driving conditions for the respective printing elements, a 3/8 coder 5 for decoding a code for designating a block, a 3-bit latch 4' for holding a 3-bit signal input to the decoder, a 4-bit shift register 4 for sequentially holding input 4-bit data signals, a 44-bit latch 8' for holding printing data for the 44 printing elements in a block, and a 4×11-bit shift register 8 for sequentially holding 11 input 4-bit data signals.

Similar to FIG. 1, reference symbol VH denotes a power supply line for supplying a printing current to each printing element 1; GNDH, a printing current ground conductive line; VDD, a power supply line for a logic circuit, and GNDL, a ground conductive member. Both printing current ground conductive line GNDH and ground conductive member GNDL are connected to a semiconductor substrate SUB.

Control signals input to the printhead of this embodiment include four data signal lines DATA0 to DATA3, a clock signal CLK, a latch signal LATN for defining a driving period, and four driving signals OHE1N, EHE1N, OHE2N, and EHE2N corresponding to the odd- and even-numbered printing elements in each row. Image data and block selection data (codes) continuously transferred over a 4-bit data bus are internally separated and used.

Figure 4:
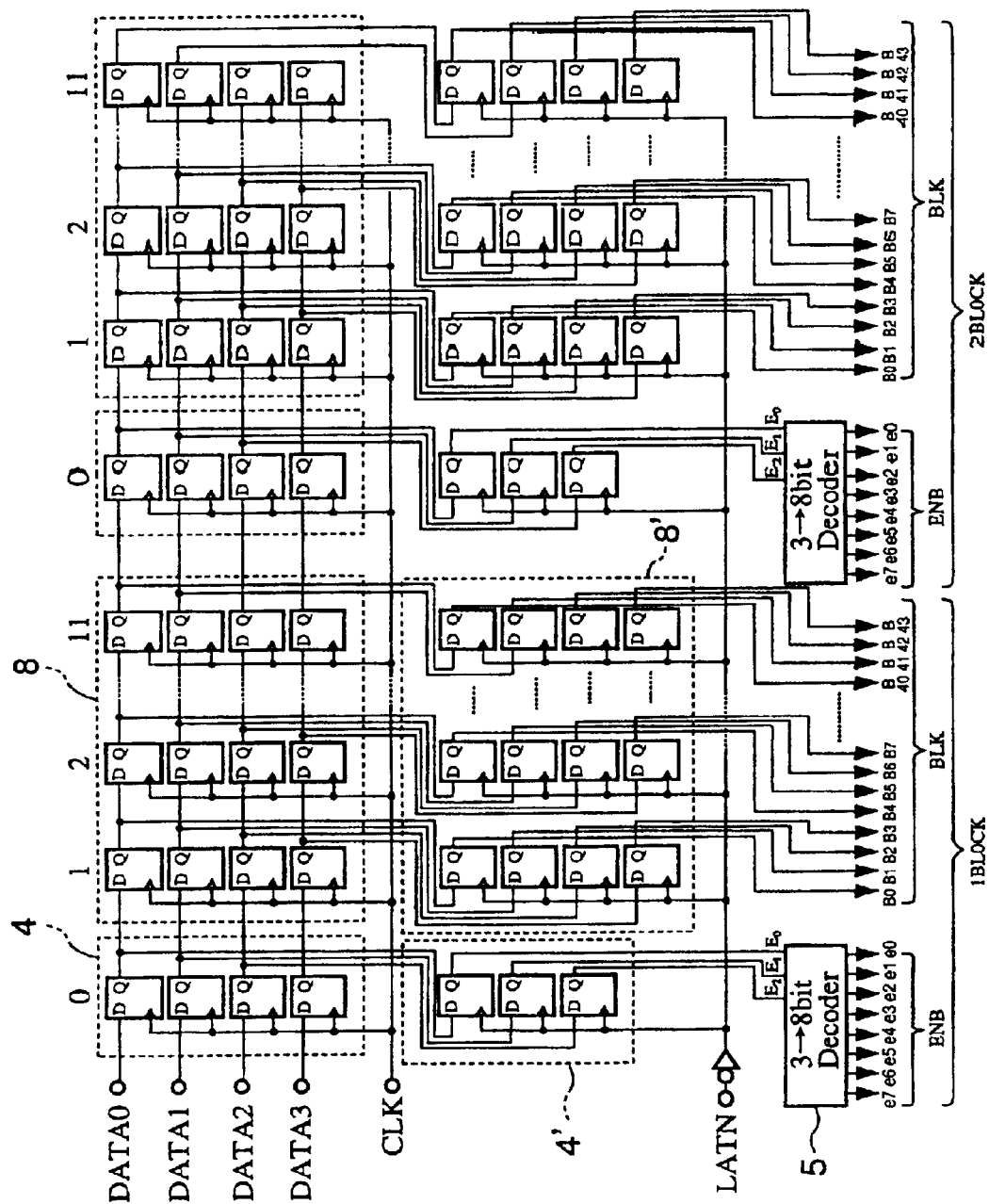
FIG. 4 is a detailed block diagram showing the flow of internal signals in part of the circuit in FIG. 3.
Figure 5:
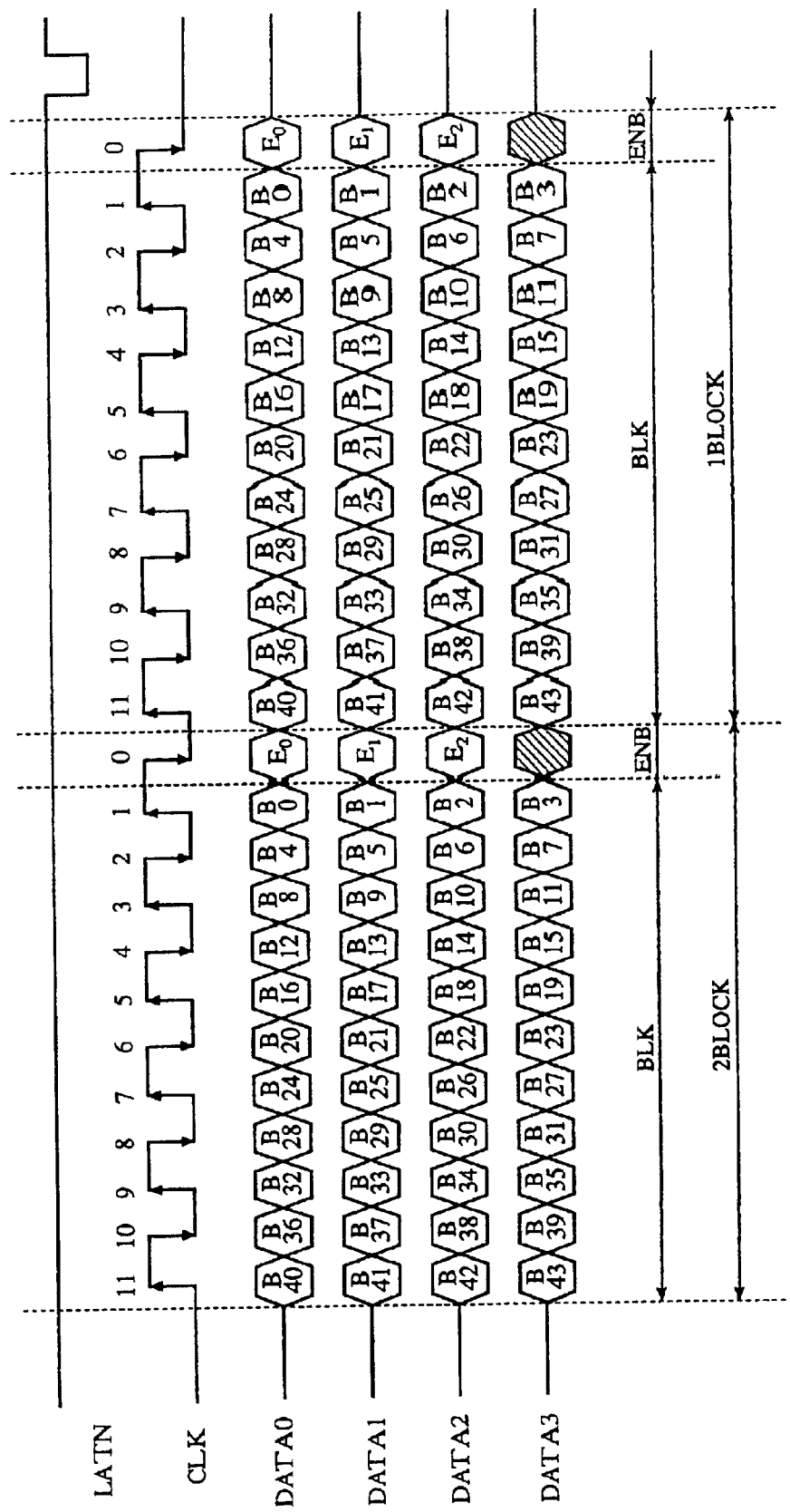
FIG. 5 is a timing chart showing the state of each signal in the circuit in FIG. 4.

FIG. 4 is a view showing the circuit arrangement for generating control signals in the circuit shown in FIG. 3. FIG. 5 is a timing chart showing the relationship between input control signals and printing control signals generated in the circuit. In this embodiment, the data transfer clock CLK shifts at leading and trailing edges at 10 MHz. This makes it possible to double the transfer speed.

Four-bit data input from the four data signal lines DATA0 to DATA3 are sequentially input to the 4-bit shift register 4 and 4×11-bit shift register 8, and then held in 3-bit latch 4' and 44-bit latch 8'. The data held in the 3-bit latch 4' are input to the 3/8 coder 5 via signal lines $E_0$ to $E_2$ to be converted into codes representing block numbers 1 to 8. As a consequence, one of signals e0 to e7 is activated.

Each of the signals e0 to e7 can simultaneously activate 44 distributed printing elements. This signal is used as the first printing control signal. As shown in FIG. 3, the printing elements belonging to the block designated by the signal e0 are those indicated by Seg numbers 1, 2, 17, 18, . . . . The printing elements belonging to the block designated by the signal e1 are those indicated by Seg numbers 3, 4, 19, 20, . . . .

The second printing control signal generated in the circuit includes BLK outputs B0 to B43. Each output can simultaneously activate eight printing elements. For example, the output B0 controls the printing elements indicated by Seg numbers 1, 3, 5, 7, ..., 15, and the output B1 controls the printing elements indicated by Seg numbers 2, 4, 6, 8, ..., 16.

By combining the ENB outputs from the 3/8 coder 5 and BLK outputs, which can be arbitrarily selected, in this manner, the 352×2 (rows) printing elements connected to the two blocks can be arbitrarily turned on/off. By forming a raster image on the printing apparatus side in accordance with this regularity, printing control data can be transferred to the printhead at a high speed. In this embodiment, printing control data for the two printhead rows are continuously input to DATA [3..0] terminals. Note that since block designation data input to the 3/8 coder 5 in this embodiment consists of 3 bits, one bit of DATA 3 is masked. If, however, the number of divided blocks or printing elements increases, this signal can also be used.

Figure 6:
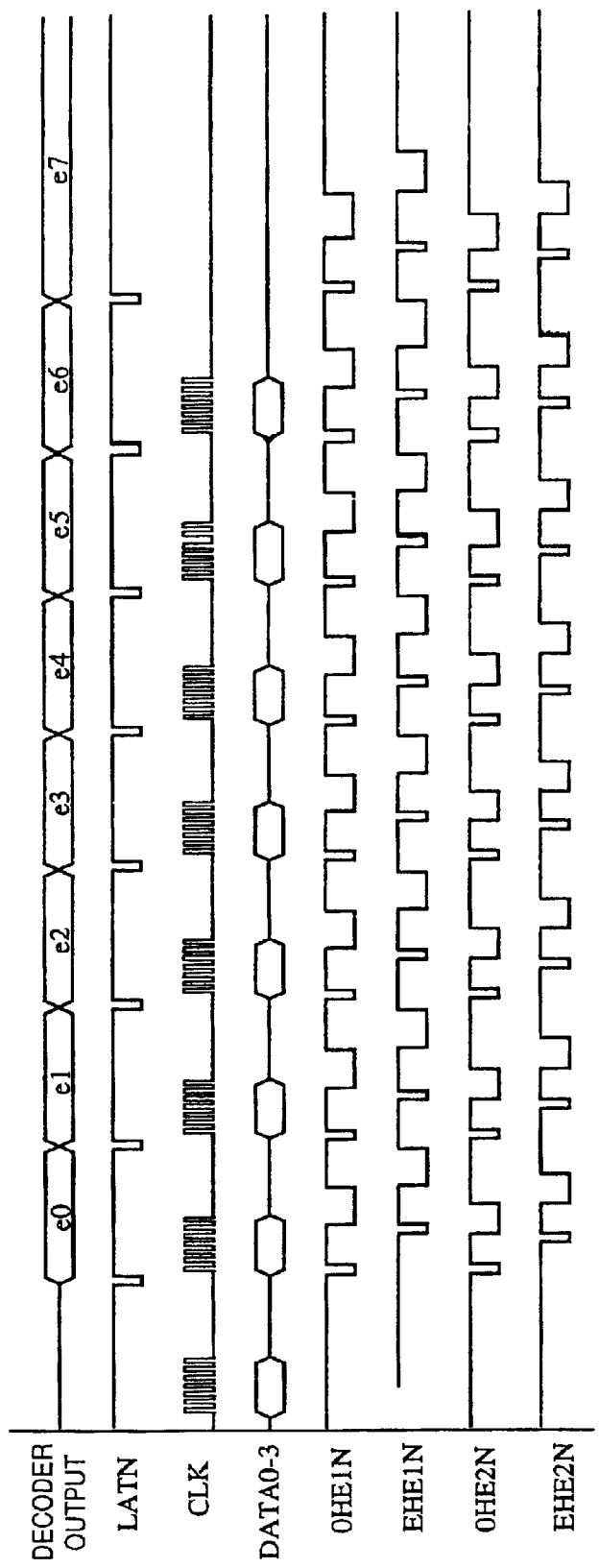
FIG. 6 is a timing chart showing the state of each signal in the circuit in FIG. 3.

FIG. 6 is a timing chart for driving all the printing elements shown in FIG. 3. BLK data corresponding to one output ENB1 from the coder circuit is transferred to the DATA line and held by the latch signal LATN. Immediately after this operation, the next printing control data is input. At the same time, driving signals to be converted into printing energies are input. As described above, these signals correspond to odd- and even-numbered printing elements (OH1N/EHE1N), and are input for each printing element row (OHE1N, EHE1N/OHE2N, EHE2N).

If, for example, different printing energies are required for the respective printing element rows, different energy amounts can be input for the respective rows. When, for example, each printing element includes an electrothermal transducer, the printing density or dot shape can be changed by inputting a signal upon changing its pulse width. In addition, odd- and even-numbered printing elements can be driven by inputting signals to them while the pulse width of each signal is divided into a pre-pulse and main pulse.

When each printing element is to be driven by double pulses, a halt period is set between a pre-pulse and a main pulse, as shown in FIG. 6. A scheme of inserting a pre-pulse for another terminal in this halt period (interlaced driving) is also known. As described above, the arrangement capable of separately controlling odd- and even-numbered printing elements can cope with various printhead driving schemes. Since the above interlaced driving scheme can shorten the pulse input period while preventing adjacent printing elements from being simultaneously turned on, the time required to drive all the printing elements can be substantially shortened.

The printhead of this embodiment can be manufactured with all the above printing elements and driving circuits being mounted on a semiconductor circuit board. In this case, the printing elements in the two rows may be arranged in a staggered form to increase the printing density, or the printing elements on one side may be used for monochrome printing while those on the other side are used for color printing. Alternatively, the printing elements may be arranged in accordance with the above divisional driving pattern to physically cope with time differences in driving.

As described above, according to this embodiment, based on the first embodiment, data signals input from the 4-bit data bus are converted into the first and second printing control signals and used. In addition, the latch circuits are used to hold the respective bits transferred over the data bus so as to hold the data of the first and second control signals until the next data updating operation after the data transfer.

This method produces a time margin in inputting a driving signal to be converted into printing energy. If a printhead having 600 or more printing elements is driven at a printing frequency of 10 kHz or more, since the number of divided blocks increases as well, such a time margin cannot be produced. A characteristic feature of this embodiment is that even if such many printing elements are arranged in a plurality of rows, printing control data can be transferred over a single bus. In addition, the data transfer time can be minimized with respect to the printing period.

When adjacent printing elements are simultaneously driven, heat accumulation, crosstalk, and the like occur, resulting in a deterioration in printing state. In consideration of this problem, control inputs capable of separately driving even- and odd-numbered printing elements are set for the respective printing element rows. When further consideration is given to pixels simultaneously printed in forming an image, printing elements to be selected by ENB can also be set on each printing element row for every several pixels. In this case, for the sake of descriptive convenience, adjacent printing elements belong to the same block.

As described above, a bit input to the decoder circuit for DATA3 is masked. As is obvious, however, the current number of printing elements grouped can be doubled by only adding data to this portion from the printing apparatus. That is, a characteristic feature of this embodiment is that the number of printing elements controlled can be doubled without changing the transfer speed. This arrangement for printing control data transfer can cope with various types of printheads. This makes it possible to greatly reduce the developing/manufacturing cost for this apparatus and produce a great merit in terms of a printhead.

High-speed data transfer and a reduction in printing energy application time realized by the specific driving method of this embodiment can produce a time margin on the printing apparatus side where the printhead is driven.

[Third Embodiment]

A printhead according to the third embodiment of the present invention will be described below. The circuit arrangement shown in FIGS. 3 and 4 of the second embodiment, is adapted to receive the image data and the block selection data (code) which are positioned alternately. In this embodiment, the circuit arrangement shown in FIGS. 3 and 4 is improved so that the kind of data is easily known by making the arrangement to collect the image data group and the block selection data group and to transfer them in group.

Figure 7:
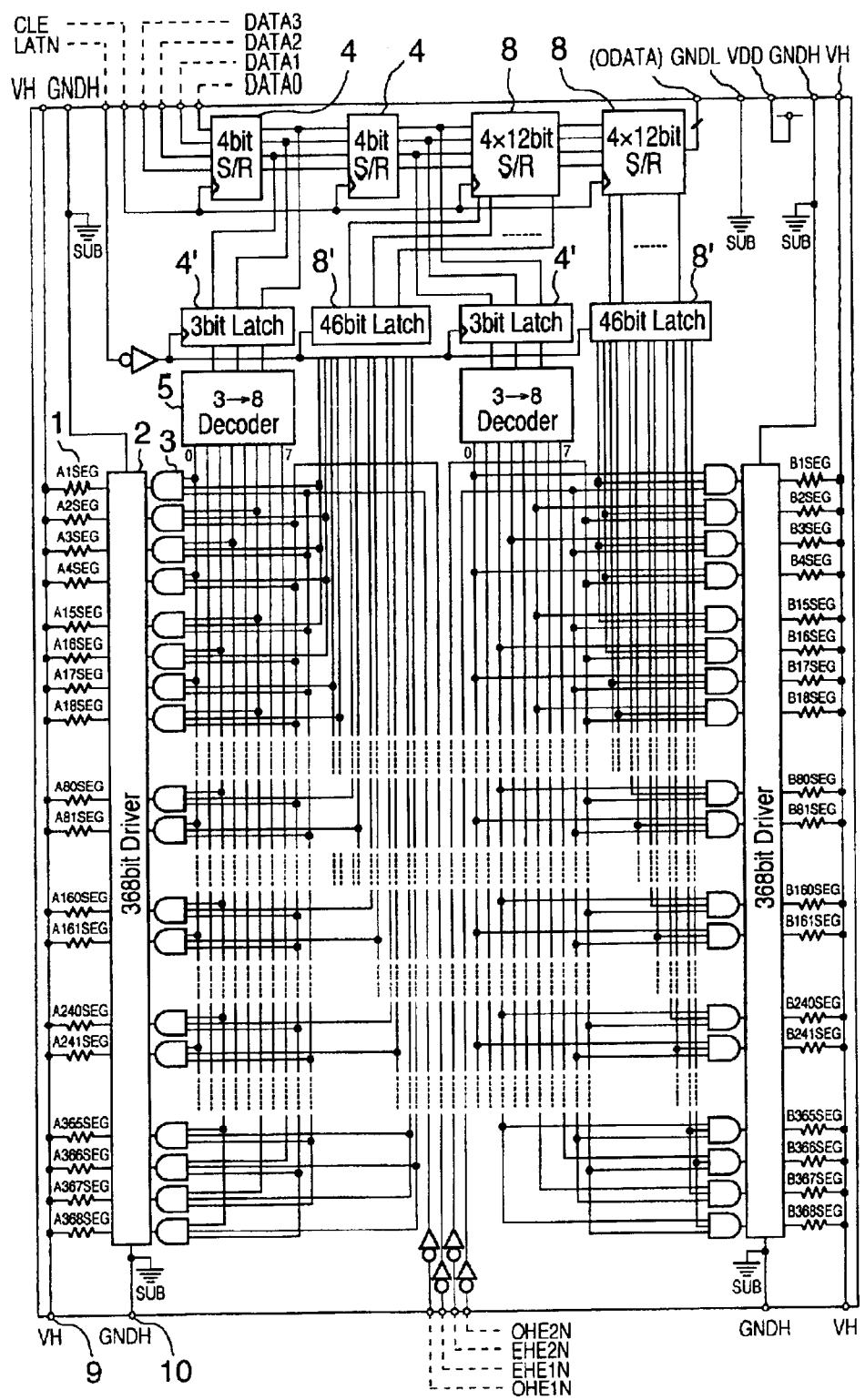
FIG. 7 is a block diagram showing the circuit arrangement of a printhead according to the third embodiment of the present invention.

Such a circuit arrangement of this embodiment on the semiconductor substrate for the printhead is shown in FIG. 7. The arrangement shown in FIG. 7 differs from the arrangement shown in FIG. 3, in the layout of the 4-bit shift register for receiving the block selection data, in the shift register 8 for receiving the image data, and in the number of printing elements 1. However, the other basic arrangement shown in FIG. 7 is similar to that of FIG. 3.

Figure 8:
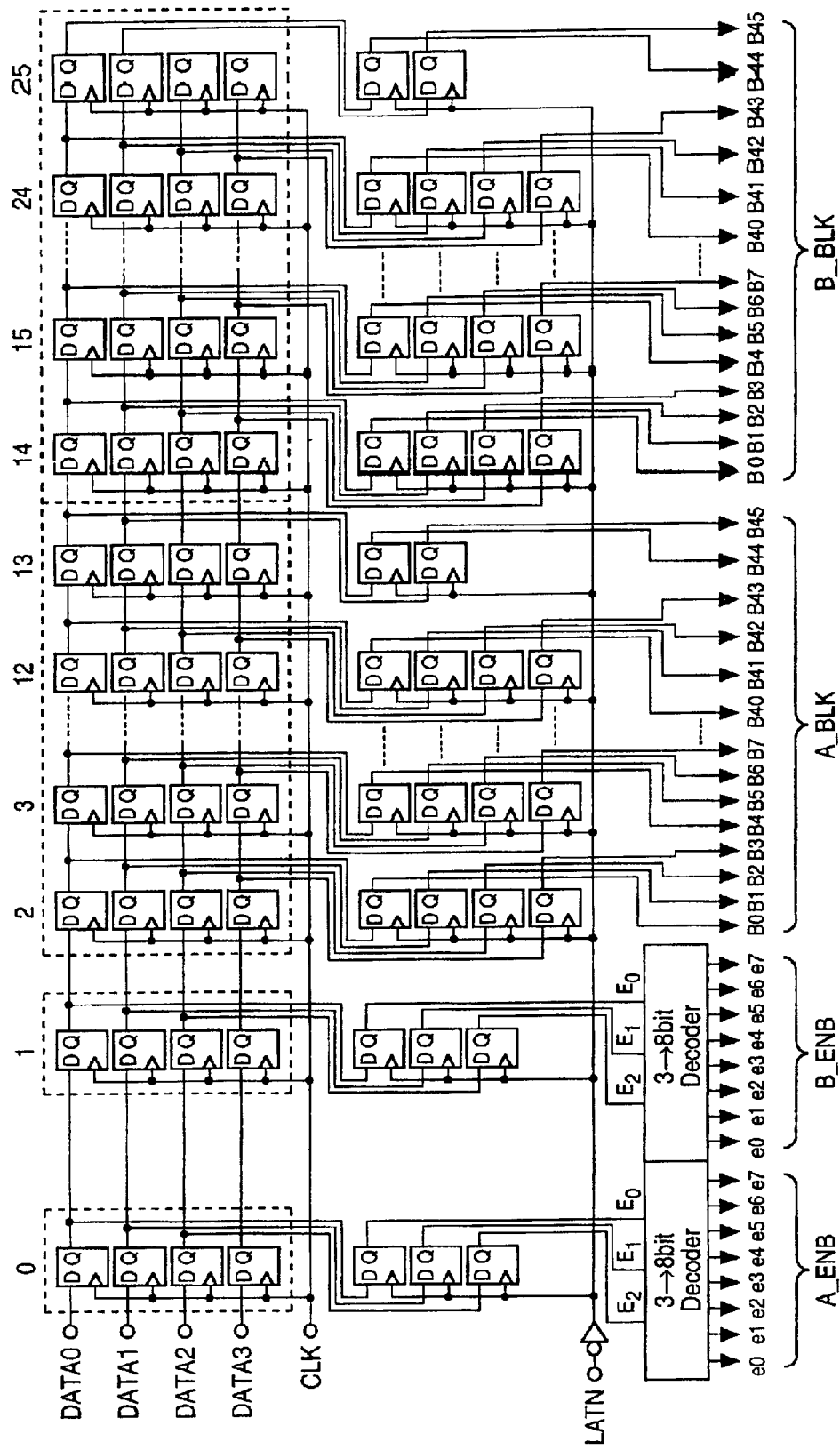
FIG. 8 is a detailed block diagram showing the flow of internal signals in the circuit in FIG. 7.
Figure 9:
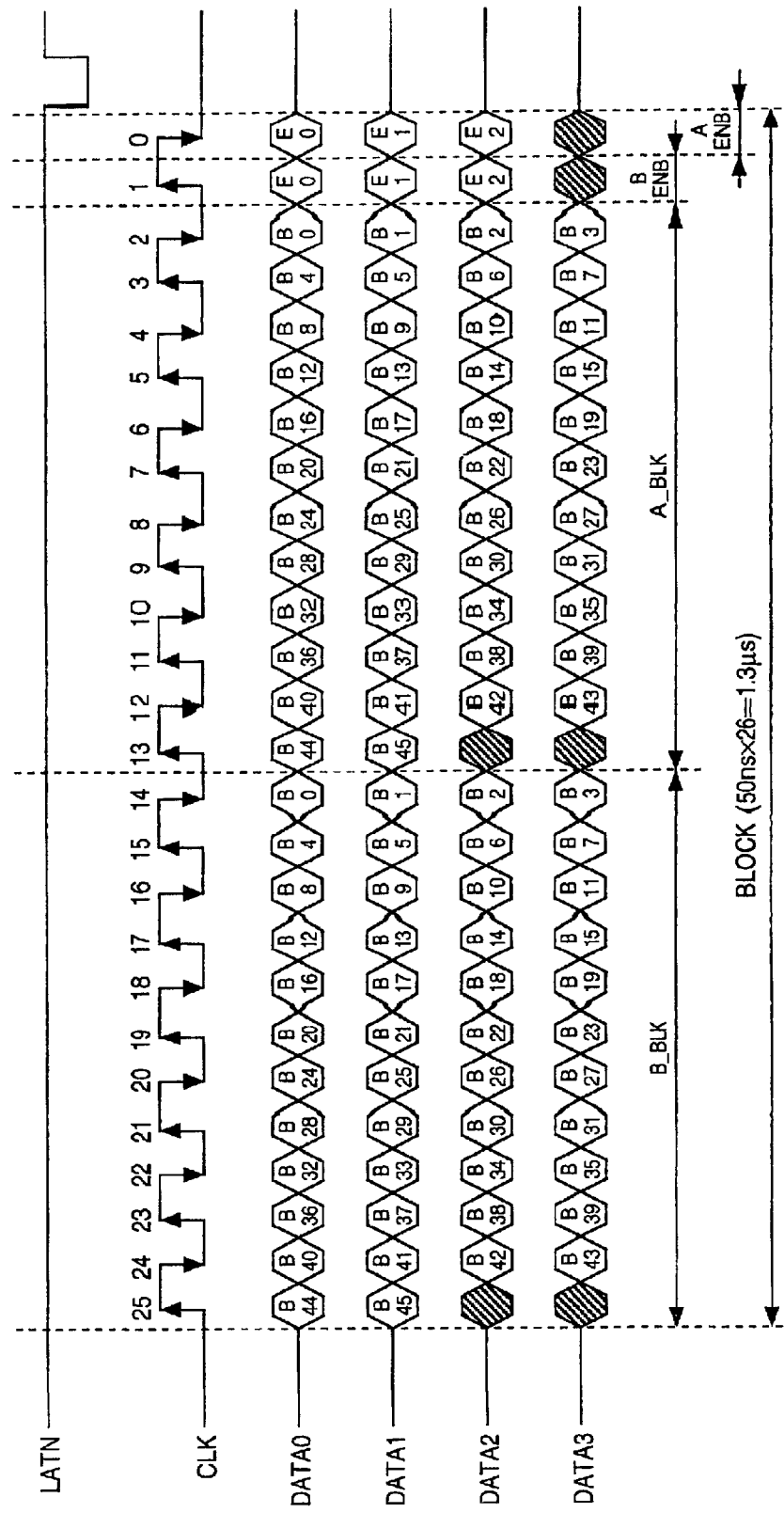
FIG. 9 is a timing chart showing the state of each signal in the circuit in FIG. 8.

FIG. 8 shows a detailed circuit arrangement in part of the semiconductor substrate for the printhead. Similar to FIG. 7, the arrangement shown in FIG. 8 differs from the arrangement shown in FIG. 4, in the layout of the 4-bit shift register for receiving the block selection data, in the shift register 8 for receiving the image data, and in the number to printing elements 1. However, the other basic arrangement shown in FIG. 8 is similar to that of FIG. 4. And timings of the data transfer are shown in FIG. 9.

Note that the positions of circuits for controlling the image data group and the block selection data group are arbitrarily set within the semiconductor substrate in accordance with the arrangement of the corresponding printhead.

Further, it is also possible to arrange the circuit shown in FIG. 7 to allocate the circuits for upper bits and lower bits on respective shorter sides of the semiconductor substrate (not shown). In this case, in the circuit layout, wiring length on the substrate is advantageously shortened, thereby miniaturizing the size of the semiconductor substrate.

R that are consecutively arranged, and the numerals in the row represent the numbers of signals output from the latch 4 and decoder 5.

TABLE 1

|    | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | ... |
|----|---|---|---|---|---|---|---|---|---|----|----|----|----|----|----|----|----|----|----|----|----|----|----|----|----|-----|
| 1  | ▓ |   |   |   |   |   |   |   |   |    |    |    |    |    |    |    | ▓  |    |    |    |    |    |    |    |    |     |
| 2  |   | ▓ |   |   |   |   |   |   |   |    |    |    |    |    |    |    |    | ▓  |    |    |    |    |    |    |    |     |
| 3  |   |   | ▓ |   |   |   |   |   |   |    |    |    |    |    |    |    |    |    | ▓  |    |    |    |    |    |    |     |
| 4  |   |   |   | ▓ |   |   |   |   |   |    |    |    |    |    |    |    |    |    |    | ▓  |    |    |    |    |    |     |
| ⋮  |   |   |   |   |   |   |   |   |   |    |    |    |    |    |    |    |    |    |    |    |    |    |    |    |    |     |
| 13 |   |   |   |   |   |   |   |   |   |    |    |    | ▓  |    |    |    |    |    |    |    |    |    |    |    |    |     |
| 14 |   |   |   |   |   |   |   |   |   |    |    |    |    | ▓  |    |    |    |    |    |    |    |    |    |    |    |     |
| 15 |   |   |   |   |   |   |   |   |   |    |    |    |    |    | ▓  |    |    |    |    |    |    |    |    |    |    |     |
| 16 |   |   |   |   |   |   |   |   |   |    |    |    |    |    |    | ▓  |    |    |    |    |    |    |    |    |    |     |

[Fourth Embodiment]

Figure 10:
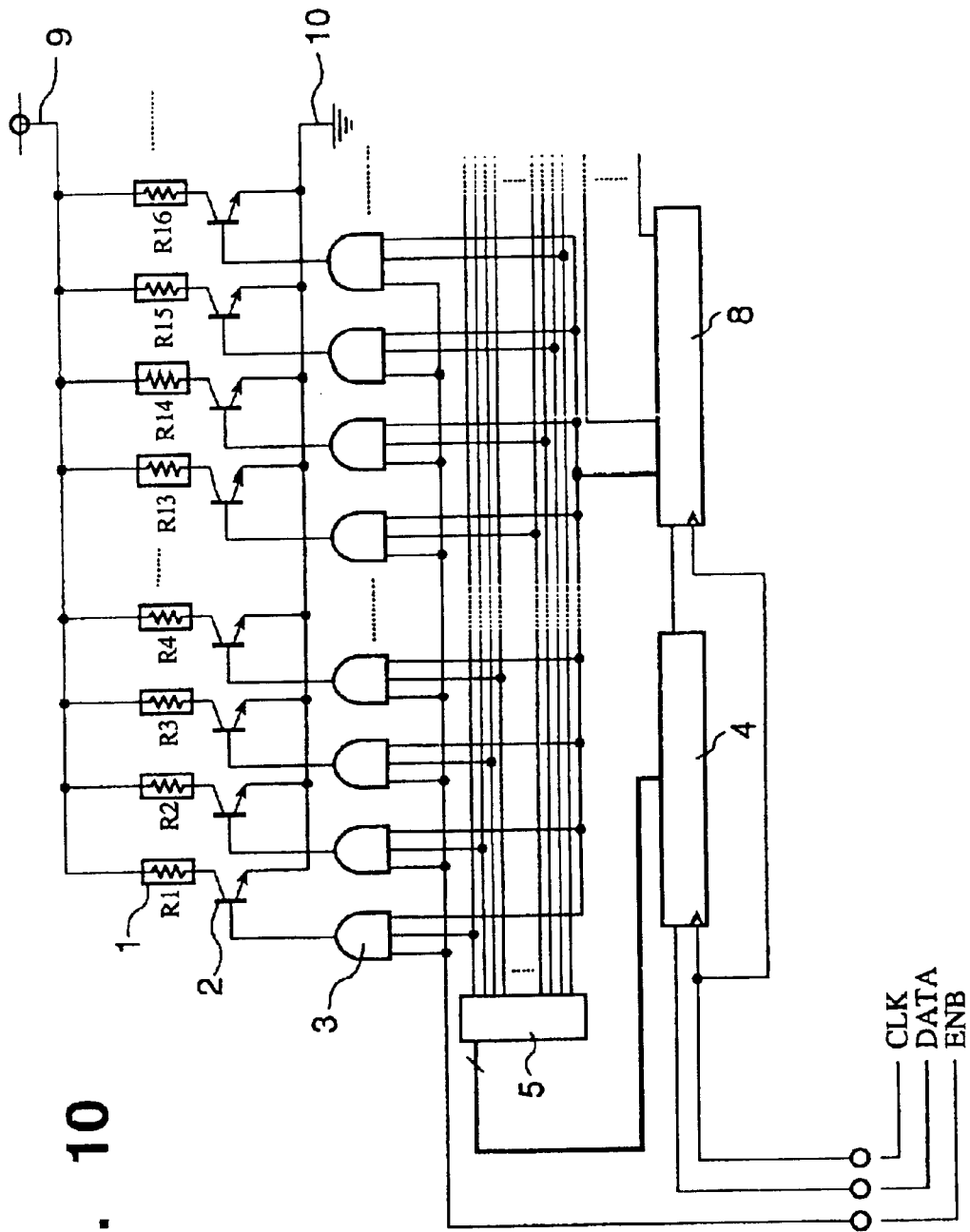
FIG. 10 is a block diagram showing the circuit arrangement of a printhead according to the fourth embodiment of the present invention.

A printhead according to the fourth embodiment of the present invention will be described below. FIG. 10 is a block diagram showing the arrangement of the printhead according to the fourth embodiment of the present invention. The same reference numerals as in the first embodiment denote the same parts in the fourth embodiment, and a detailed description thereof will be omitted. The arrangements of printing elements and functional elements for driving them are the same as those in the first embodiment. The connection arrangement of the printing elements is similar to that in the second embodiment.

Referring to FIG. 10, reference numerals 4 and 8 denote latch circuits for holding block selection data input to a common data bus (line) DATA and encoded image data. In this case as well, the latches 4 and 8 function as shift registers capable of updating the driven block selection data and encoded image data in units of blocks. One output signal from the shift register 8 can simultaneously activate 16 consecutive printing elements. This signal is used as the first printing control signal; output 1 is made to correspond to R1 to R16, and output 2 is made to correspond to R17 to R32, i.e., 16 printing elements.

The latch 4 and decoder 5 output the second printing control signal for controlling printing elements to be simultaneously turned on within a block. If, for example, the shift register 4 is capable of handling 4-bit data, 16 printing elements can be controlled at maximum. Output 1 from this decoder circuit is connected in correspondence with R1, R17, R33, R49, . . . of printing elements 1, whereas output 2 is connected in correspondence with R2, R18, R34, R50, . . . of the printing elements 1.

As a consequence, a block of printing elements to be simultaneously driven is selected by the second printing control signal, and specific printing elements in this printing element group which are to be turned on can be arbitrarily selected by the first printing control signal. By repeating this operation 16 times, the printing elements of the printhead of this embodiment can be driven/controlled up to 256 printing elements.

Table 1 below shows the connection arrangement of the printing elements in this embodiment. In table 1, the numerals in the column represent the numbers of printing elements Each output signal from the printing control unit 8 can activate all printing elements within the bold-line frame in the table (e.g., from R1 to R16). While blocks are selected by the second printing control signals from the latch 4 and decoder 5, the printing elements in each block are separately selected by outputs from the printing control unit 8, thereby arbitrarily energizing all the 256 printing elements.

In this case, each printing control unit can be arbitrarily set in the individual selection mode or block selection mode. In addition, selected printing elements can be arbitrarily arranged; they may be arrayed in conformity with an image process in the printing apparatus.

Figure 11:
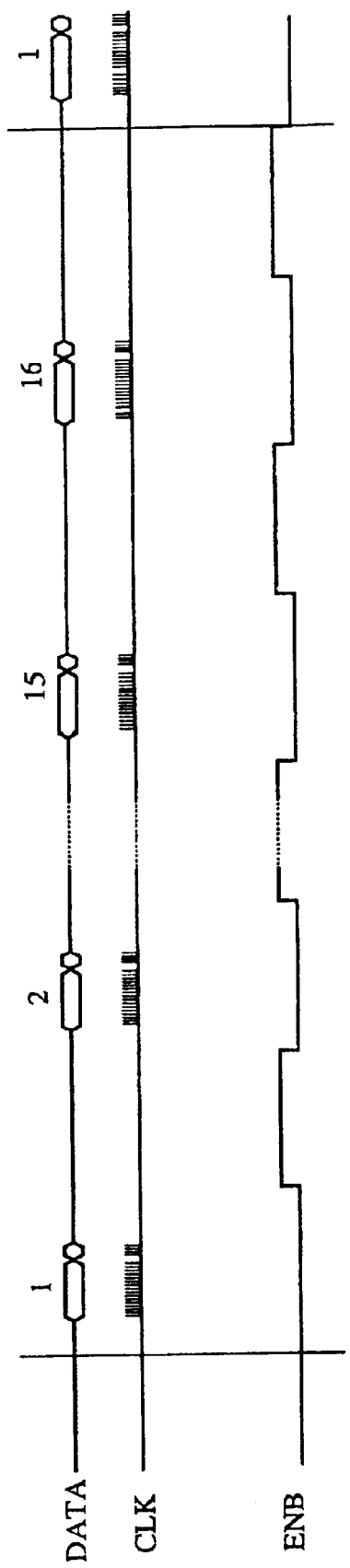
FIG. 11 is a timing chart showing the state of each signal in the circuit in FIG. 10.

FIG. 11 is a timing chart showing the state of each signal in the circuit block of FIG. 10. In this case, only one DATA signal line is used. The above encoded data for the respective printing control units are input and shifted by CLK. When the transmission of clocks is stopped, the decoder 5 and first printing control unit 8 respectively hold block selection data and data for selecting a printing element block.

By activating the ENB signal before the next clock signal CLK, the printing elements R1, R17, R33, . . . , belonging to the first block of the printing elements R1 to R256 are simultaneously energized in accordance with the image data. By repeating this processing the number of times equal to the number of signal lines of the first printing control units (4 and 8), all the 256 printing elements 1 in the printhead of this embodiment can be driven.

Obviously, when the block selection data sent to the decoder 5 selects 16 first, the printing elements R16, R32, R48, . . . are activated, and printing currents are simultaneously supplied to them for a period of time corresponding to the pulse width input to the ENB signal.

According to this embodiment, since the numbers of shift registers 4 and 8 can be decreased with respect to the total number of printing elements, the circuit arrangement can be simplified, and the chip size can be reduced. In this embodiment, the number of control signals (terminals) is three. As in the second embodiment, data is transmitted over a bus, and a further increase in transfer rate can be attained.

As a printhead used for serial printing, for example, a printhead having a printing density of 600 dpi and about 300 to 600 printing elements is expected to be generally used in the future. There is a merit in setting the number of connection terminals connected to the printing apparatus body to be smaller than that in the prior art as in this embodiment. When an elongated industrial printhead such as an elongated full-line printhead is used, a scheme of transferring data signals over a bus to realize high-speed transfer can be effectively used.

[Fifth Embodiment]

Figure 12:
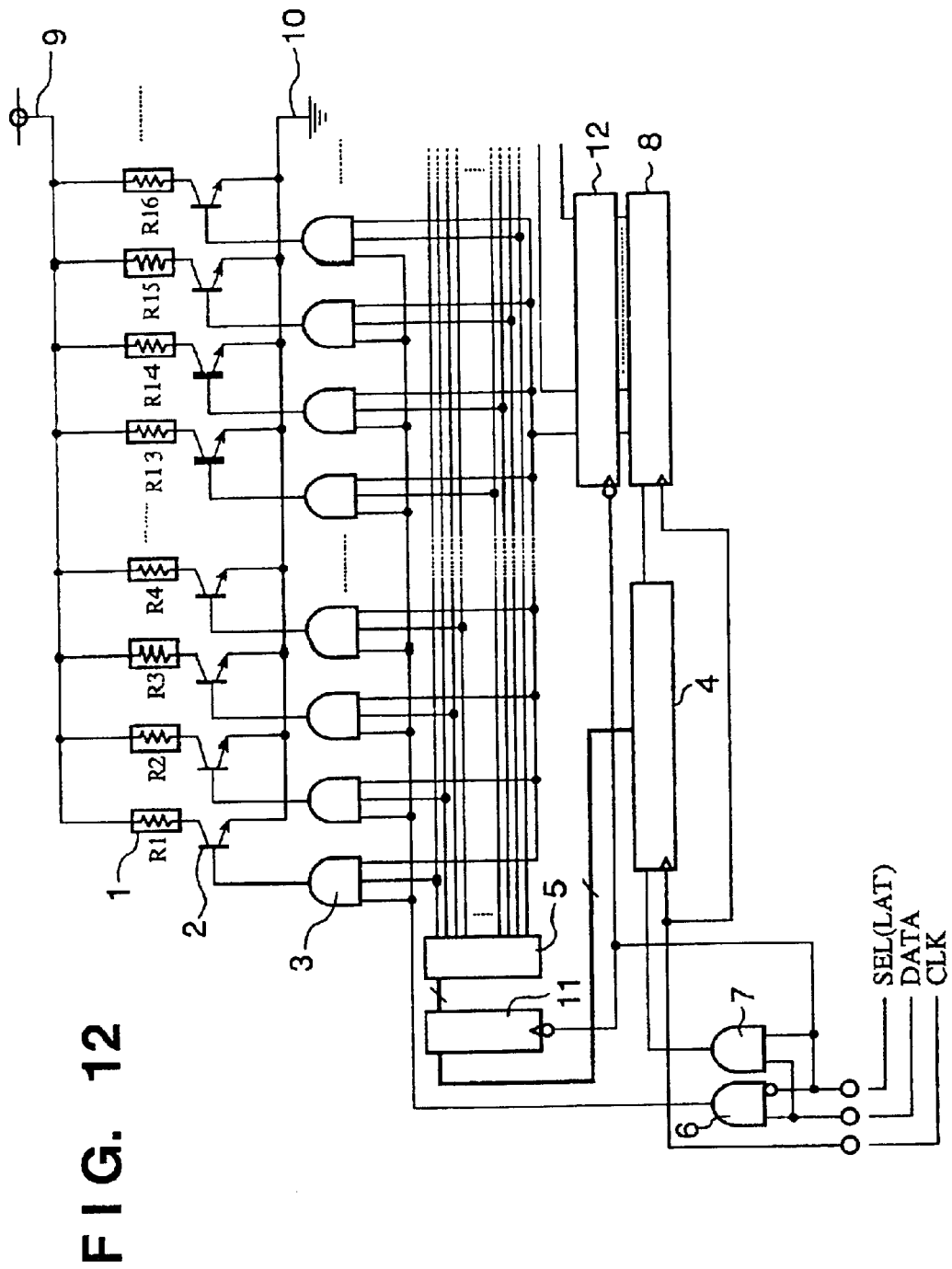
FIG. 12 is a block diagram showing the circuit arrangement of a printhead according to the fifth embodiment of the present invention.

A printhead according to the fifth embodiment of the present invention will be described below. FIG. 12 is a block diagram showing the arrangement of a printhead according to the fifth embodiment of the present invention. The same reference numerals as in the fourth embodiment denote the same parts in the fifth embodiment, and a detailed description thereof will be omitted. In this embodiment, input signals for applying driving energy to printing elements 1 are also used as latch signals.

The circuit arrangement shown in FIG. 12 is almost the same as that shown in FIG. 10 except that latches 11 and 12 are additionally used to temporarily hold data in shift registers 4 and 8. The ENB signals for applying driving energy like those described above are not used, and SEL signals also serving as latch signals are used. As a consequence, the number of input signals is three, which is equal to the number of terminals. AND circuits 6 and 7 are used to sort signals input from the DATA terminal into driving control data and driving energy signals in accordance with the states of signals input form the SEL terminal. With this arrangement, signals input from the ENB terminal can also be used as signal input from the DATA terminal.

Figure 13:
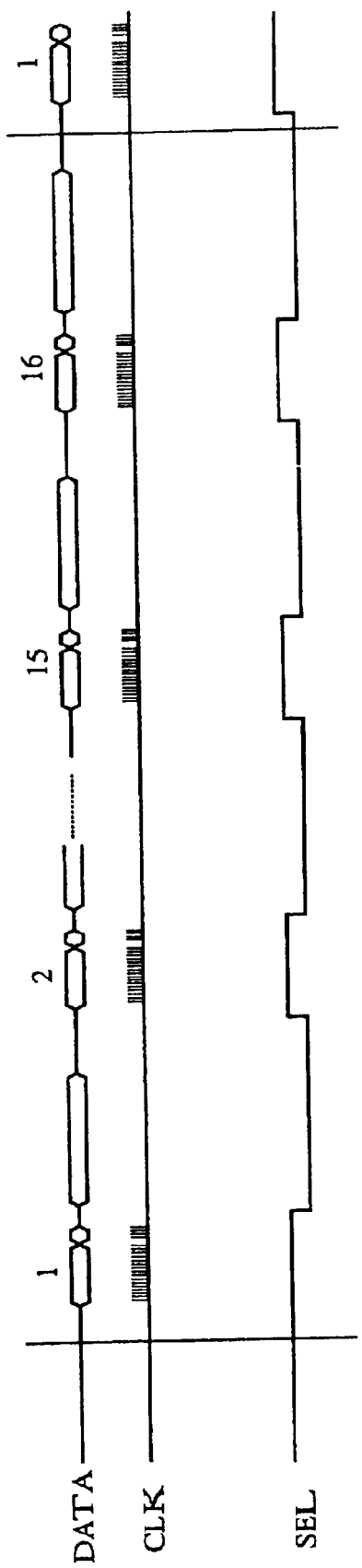
FIG. 13 is a timing chart showing the state of each signal in the circuit in FIG. 12.
Figure 14:
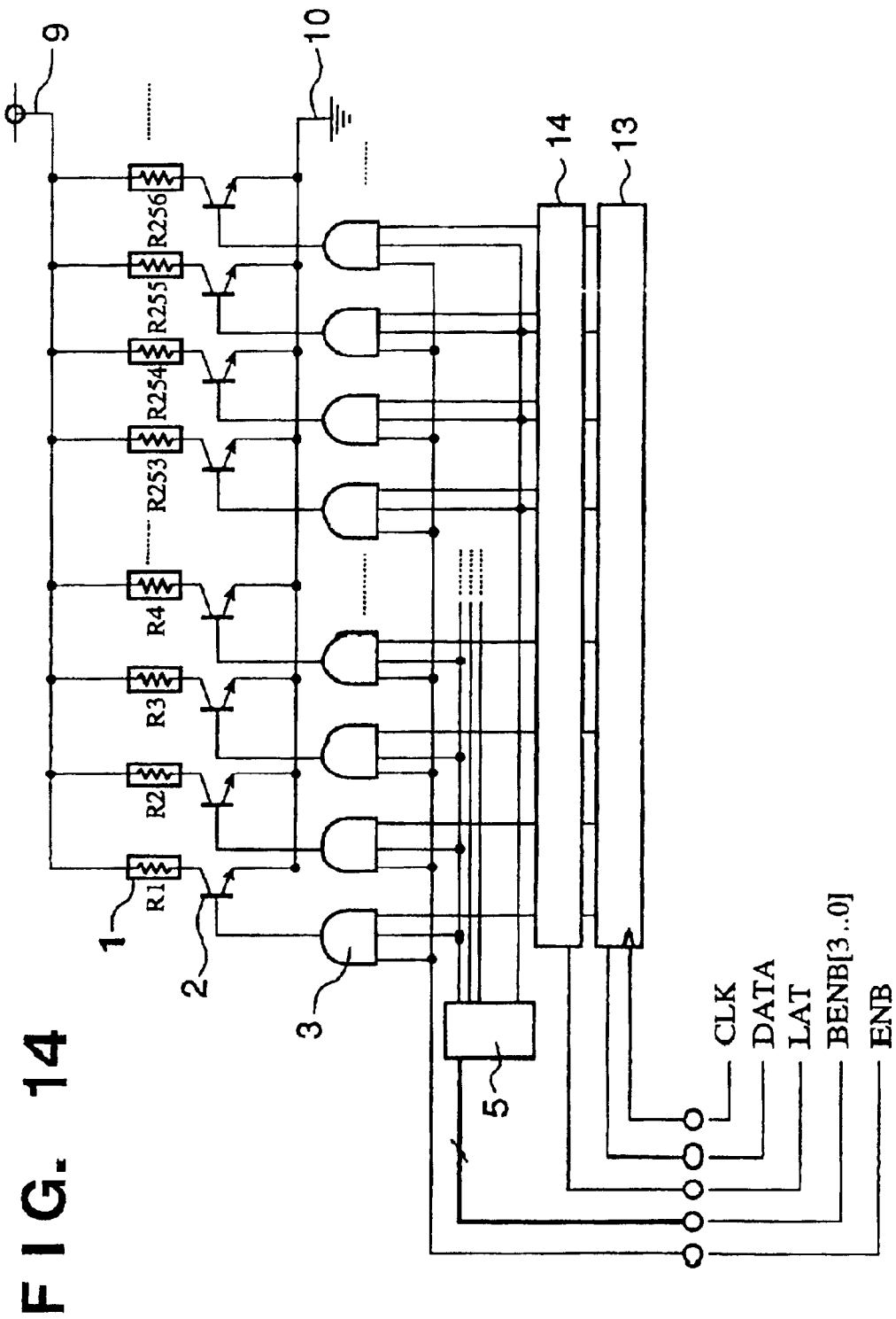
FIG. 14 is a block diagram showing the circuit arrangement of a conventional printhead.
Figure 15:
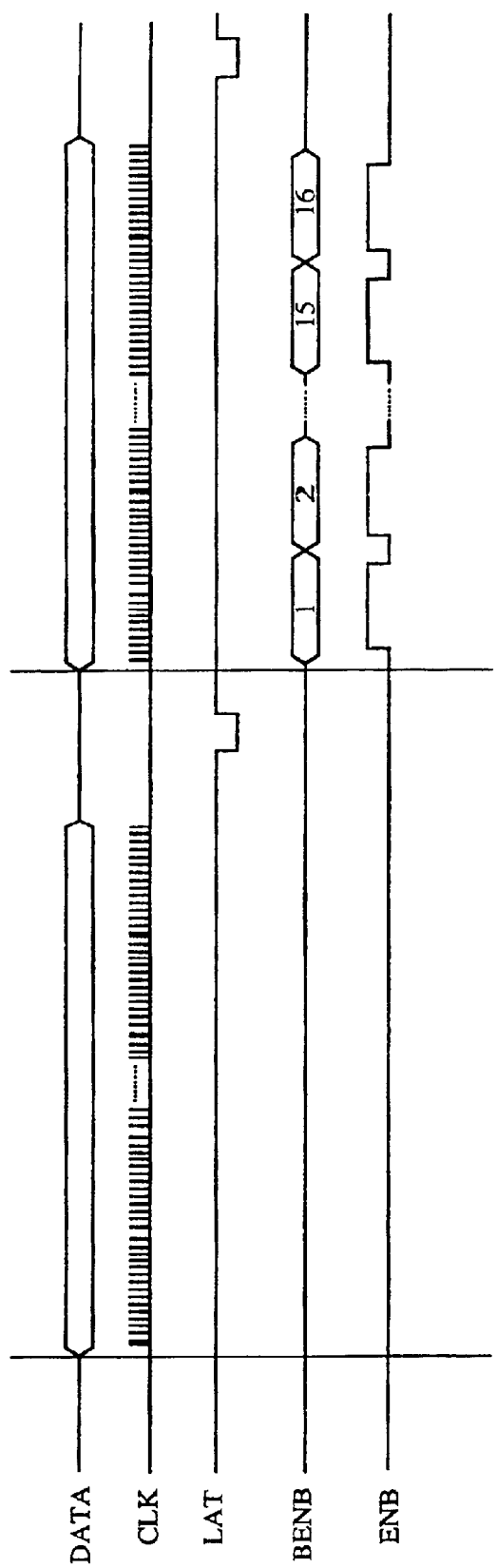
FIG. 15 is a timing chart showing the state of each signal in the circuit in FIG. 14.

FIG. 13 is a timing chart showing the state of each signal in the circuit of this embodiment. As shown in FIG. 13, while the SEL signal is ON, control data corresponding to image data is input from the DATA terminal in synchronism with CLK and held in the latches 11 and 12 to select printing elements to be driven. While the SEL signal is OFF, pulses corresponding to driving energy signals from the DATA terminal are input to drive the printing elements. That is, data associated with the driving timing of printing elements are input from the DATA terminal continuously with respect to the image data, and a length of time (period of time) during which the printing elements are driven can be set in accordance with the pulse width of the data (signal) associated with this driving timing.

In this case, different driving energy signals can also be sent out from the printing apparatus side in units of blocks. In addition, by monitoring a rise in the temperature of the printhead, the pulse width of a driving energy signal can be changed. In addition to the case exemplified by this embodiment, it is relatively easy to cope with a case where several pulse tables are required, a case where the waveform of a driving pulse must be updated for each block, and the like. For example, the pulse width can be changed in accordance with the number of printing elements in a block which are simultaneously turned on.

Although not shown, methods other than the method of inputting driving energy as the width of a pulse in applying driving energy may be used. For example, grayscale printing data may be used to print an area corresponding to one pixel with a plurality dots. By transferring grayscale data corresponding to one pixel over a data bus or serially transferring it as multilevel data, this technique can be reflected in the above embodiment. When, for example, one pixel is to be printed by selectively using two printing elements, grayscale printing can be performed by transferring grayscale data over the data bus upon encoding the data. In addition, this embodiment can use a technique of inputting data having a pulse width to the printhead upon encoding it, and generating a pulse having a width corresponding to the code inside the printhead.

[Other Embodiment]

In addition to the four embodiments described above, several methods can be conceived. Such signal input methods can be arbitrarily set on the basis of the arrangements of a printhead and printing apparatus. Many methods depend on an image processing method for a printhead, in particular, and the layout of printing elements and correspondence with blocks are based on this. Therefore, an arrangement is preferably set such that whether to transfer a printing control signal at a high speed or temporarily hold it by using a latch circuit is determined, in inputting the printing control signal, on the basis of the number of printing elements to be simultaneously driven or block intervals.

In any case, as is obvious from these embodiments, the present invention provides an arrangement capable of inputting printing control signals for the printhead regardless of the number of printing elements. That is, by encoding (converting) an input signal, obtained by bit-mapping an image to be printed into raster data, into a multilevel signal and using it as a printing control signal, printhead control can be simplified, and high performance can be realized.

Although the arrangement of a printing apparatus using the printhead of the present invention will be described later, if an integrated circuit for arbitrating printing control signals is mounted on a carriage on which the printhead is mounted, information for the printhead can be communicated as well as printing control signals. For example, the function of checking a temperature sensor and the like on the printhead can be encoded, and the resultant register value is mapped on the integrated circuit. Alternatively, an image data pattern or grayscale printing data can be encoded and the timing of feedback control for them can be encoded. A circuit on the printhead is preferably capable of directly handling these encoded data to directly convert the data into driving control data for printing elements.

[Mechanical Arrangement of Printhead]

A printhead is disclosed in Japanese Patent Laid-Open No. 8-108550, which has an arrangement in which a circuit for the printhead like the one disclosed in this embodiment is mounted as a semiconductor integrated circuit on a substrate on which printing elements are arranged or is integrally formed in the same substrate as the substrate on which printing elements are arranged. Obviously, a printhead may incorporate a portion of the above circuit arrangement, e.g., a decoder, as an arrangement outside a substrate. If, however, the above circuit is formed as a substrate (element substrate) for the printhead of the present invention, printing control on printing elements is complete. This makes it possible to form a high-performance printhead with a simple arrangement. In this case, since the number of terminals connected to the carriage on which the printhead is mounted can be minimized, a printing apparatus with high reliability can be provided.

Figure 20A:
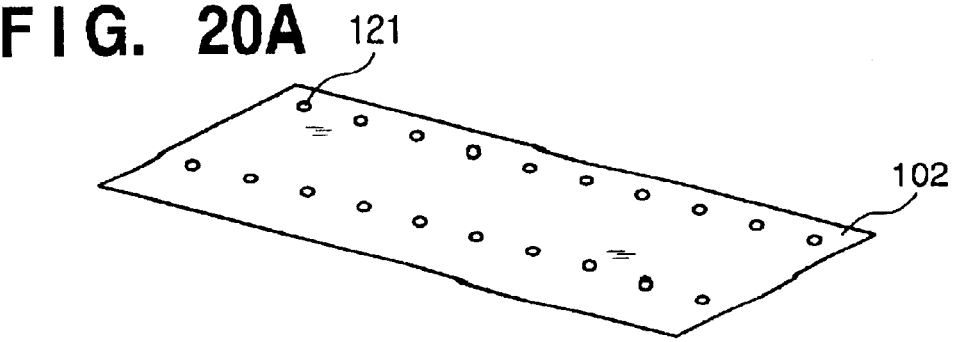
FIGS. 20A to 20C are exploded perspective views showing the mechanical arrangement of the printhead of the present invention.
Figure 20B:
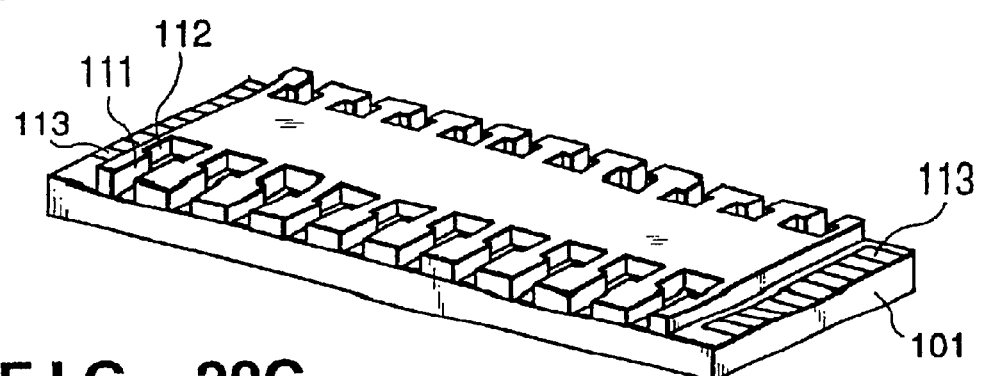
Figure 20C:
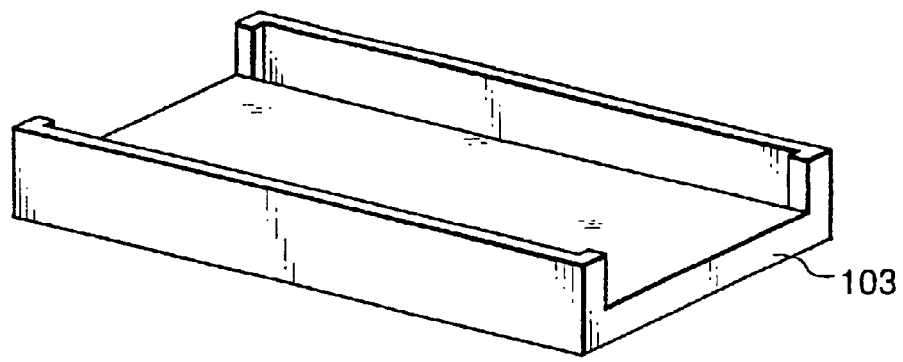

FIGS. 20A to 20C are exploded perspective views showing the mechanical arrangement of an ink-jet printhead to which the circuit arrangement of the printhead of the above embodiment is applied.

Heating resistors 112 serving as electrothermal transducers forming printing elements are formed on an element substrate 101 formed by integrating the above circuit arrangement shown in FIG. 17 with a silicon substrate or the like. Channels 111 surround the resistors and extend toward the two sides of the substrate. A resin such as a dry film, SiN, or the like can be used as a material for these channels.

An orifice plate 102 shown in FIG. 20A has a plurality of orifices 121 at positions to oppose heating resistors 112 and is joined to the member forming the channels.

A wall member 103 shown in FIG. 20C is used to from a common liquid chamber for supplying ink. Ink is supplied from this common liquid chamber to each channel through an end portion of the element substrate 101.

Note that connection terminals 113 for receiving external data and signals are formed on two sides of the element substrate 101.

[Embodiment of Printing Apparatus]

Figure 21:
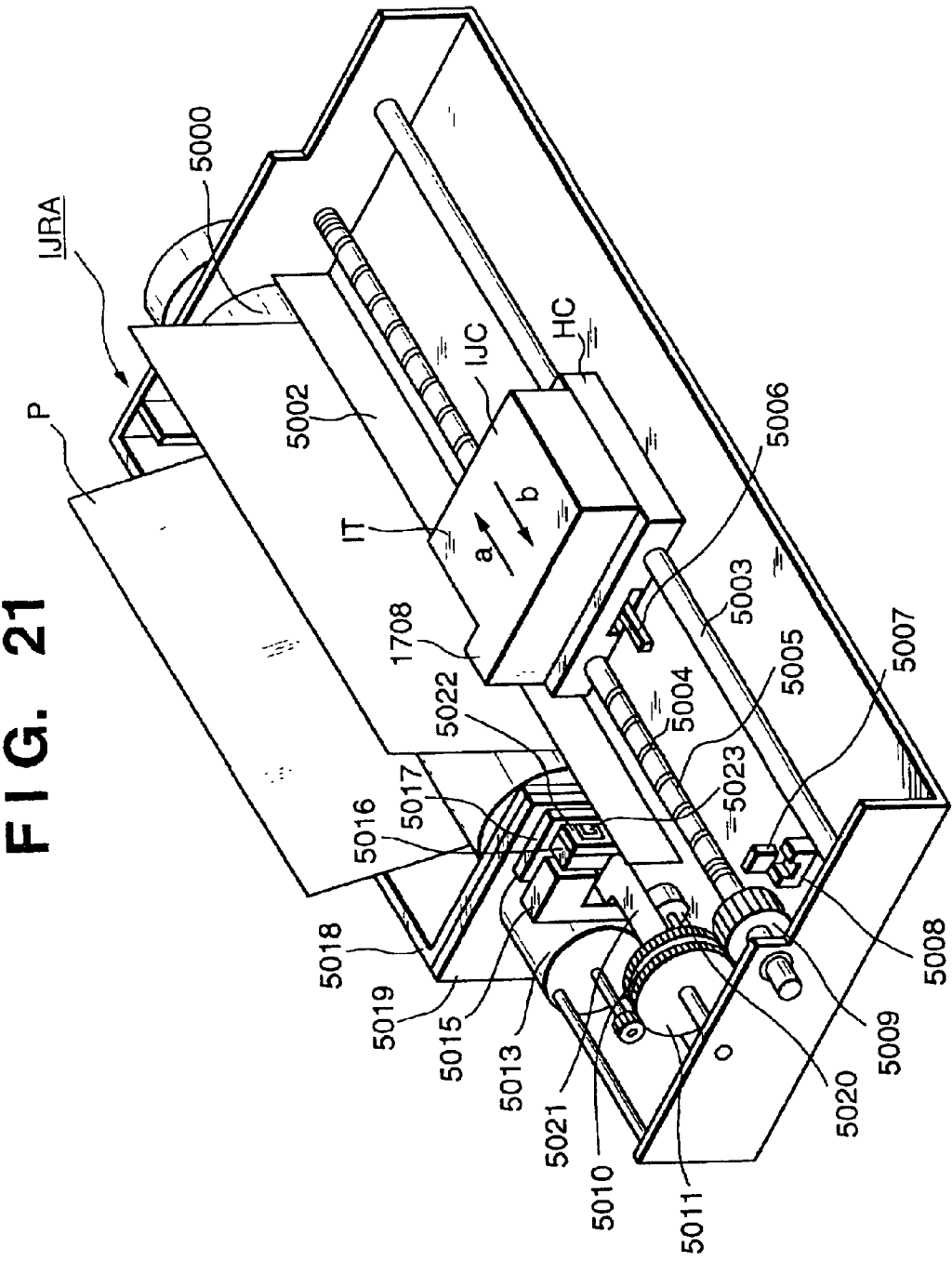
FIG. 21 is a perspective view showing the mechanical arrangement of the printing apparatus using the printhead of the present invention.

FIG. 21 is a perspective view showing the outer appearance of a printing apparatus as a typical embodiment for performing printing by using the printhead of the present invention. Referring to FIG. 21, a carriage HC engages with a spiral groove 5004 of a lead screw 5005, which rotates via driving force transmission gears 5009 to 5011 upon forward/reverse rotation of a driving motor 5013. The carriage HC has a pin (not shown), and is reciprocally scanned in the directions of arrows a and b in FIG. 21. An integrated ink-jet cartridge IJC which incorporates a printing head IJH and an ink tank IT is mounted on the carriage HC.

Reference numeral 5002 denotes a sheet pressing plate, which presses a paper sheet against a platen 5000, ranging from one end to the other end of the scanning path of the carriage. Reference numerals 5007 and 5008 denote photocouplers which serve as a home position detector for recognizing the presence of a lever 5006 of the carriage in a corresponding region, and used for switching, e.g., the rotating direction of the motor 5013.

Reference numeral 5016 denotes a member for supporting a cap member 5022, which caps the front surface of the printing head IJH; and 5015, a suction device for sucking ink residue through the interior of the cap member. The suction device 5015 performs suction recovery of the printing head via an opening 5023 of the cap member 5015. Reference numeral 5017 denotes a cleaning blade; 5019, a member which allows the blade to be movable in the back-and-forth direction of the blade. These members are supported on a main unit support plate 5018. The shape of the blade is not limited to this, but a known cleaning blade can be used in this embodiment.

Reference numeral 5021 denotes a lever for initiating a suction operation in the suction recovery operation. The lever 5021 moves upon movement of a cam 5020, which engages with the carriage, and receives a driving force from the driving motor via a known transmission mechanism such as clutch switching.

The capping, cleaning, and suction recovery operations are performed at their corresponding positions upon operation of the lead screw 5005 when the carriage reaches the home-position side region. However, the present invention is not limited to this arrangement as long as desired operations are performed at known timings.

Figure 16:
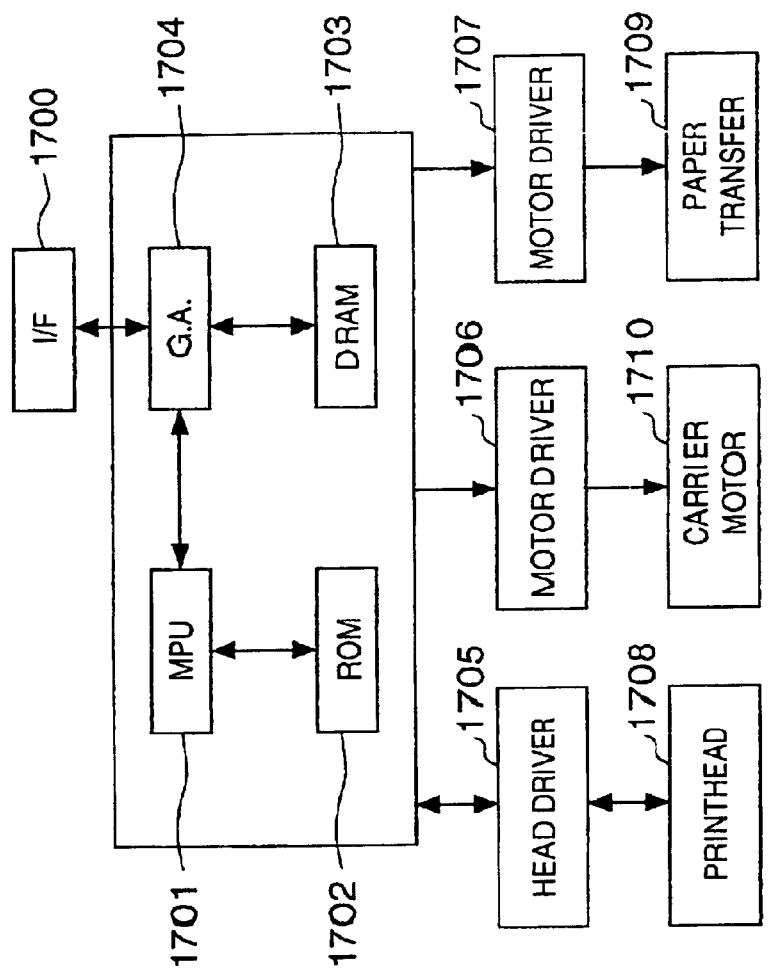
FIG. 16 is a block diagram showing a control configuration for an overall printing apparatus using a printhead of the present invention.

Then, a control circuit for performing the printing control of the printhead above. FIG. 16 is a block diagram showing the arrangement of a control circuit of the printing apparatus. Referring to FIG. 16 showing the control circuit, reference numeral 1700 denotes an interface for inputting a printing signal from an external unit such as a host computer; 1701, an MPU; 1702, a ROM for storing a control program executed by the MPU 1701; and 1703, a DRAM for storing various data (the printing signal, printing data supplied to the printing head, and the like). Reference numeral 1704 denotes a gate array (G.A.) for performing supply control of printing data to the printing head IJH. The gate array 1704 also performs data transfer control among the interface 1700, the MPU 1701, and the RAM 1703. Reference numeral 1709 denotes a carrier motor for transferring the printing head IJH in the main scanning direction; and 1708, a transfer motor for transferring a printing sheet. Reference numeral 1705 denotes a head driver for driving a head; and 1706 and 1707, motor drivers for driving the transfer motor 1708 and the carrier motor 1709.

The operation of the above control arrangement will be described below. When a printing signal is input to the interface 1700, the printing signal is converted into printing data for a printing operation between the gate array 1704 and the MPU 1701. The motor drivers 1706 and 1707 are driven, and the printing head is driven in accordance with the printing data supplied to the head driver 1705, thus performing the printing operation.

FIG. 17 is a block diagram showing the first arrangement example to explain communication between the head control unit and the printhead in FIG. 16. In the general control arrangement shown in FIG. 16, a gate array 1704 is used to control printing data supplied from an interface 1700. A characteristic feature of this arrangement is that the function of this gate array is implemented by a raster image control unit 1720 as much as possible.

Referring to FIG. 17, reference numeral 1719 denotes a carriage on which a printhead 1726 is mounted; 1720, a raster image control unit for controlling the transfer of image data in a raster form; 1721, an encoder for reading carriage position information; 1722, a power supply; and 1723 and 1724, connection portions having connection terminals.

For example, a conventional printing apparatus uses a technique of inputting image data bit-mapped by printer driver software to the interface 1700 of the printing apparatus and further bit-mapping the data in accordance with the arrangement of the printhead (printing element array) using the gate array 1704. For this reason, a memory 1703 for storing raster data is frequently accessed, resulting in a decrease in printing speed.

As described above, since encoded printing control data are sequentially transferred to the printhead of the present invention, these processes can be sped up, and the throughput can be improved. Signal lines containing encoded data generated by the raster image control unit 1720 are directly connected to the printhead 1726 via the connection portions 1723 and 1724.

When the carriage of the printhead 1726 moves in scanning operation, position detection data is obtained by the encoder 1721. This information serves as a sync signal in sending out a printing control signal. The raster image control unit 1720 can also communicate with the power supply 1722 for supplying power to the printhead under the control of the gate array 1704.

With the above arrangement, control required for printing is implemented. However, an arrangement other than this arrangement may be employed as long as encoded printing control signals are input in accordance with the printhead.

FIG. 18 shows the second arrangement example of the printing apparatus with the printhead according to the present invention. This example is almost the same as the first arrangement example shown in FIG. 17 except that a gate array 1725 for arbitration is mounted on the carriage side on which the printhead is mounted.

According to this arrangement, the arrangement of the raster image control unit 1720 can further be simplified because all printing control signals can be encoded. More specifically, signals may be transmitted to a carriage 1719 according to a communication protocol set between the raster image control unit 1720 and the gate array 1725. This makes it possible to greatly decrease the number of terminals of the connection portions 1723 and 1724.

A communication protocol may be uniquely set for the printing apparatus or an existing communication protocol may be applied without any modification. Since the gate array 1725 is mounted on the carriage 1719, the data communication speed does not depend on the circuit arrangement of a printhead 1726, and communication can be performed at a higher speed. In addition, for a serial type printhead with a print width of about ½ to 1 inch, if data are encoded, satisfactory results can be obtained even by communication at the same transfer rate as in the prior art.

Communications with the gate array 1725 can be classified into transmission of encoded raster image data during printing and transmission of a printhead information request command/reception of feedback data, which enables feedback control on a sensor and the like of the printhead 1726. If these communications are performed according to an existing sequence, complicated feedback control on the printhead can be simplified. In this case, adding a command register will facilitate processing in the printing apparatus body. Since a communication protocol is determined, an additional function can be easily recognized.

Although not shown, if the function of the gate array 1725 of the carriage 1719 is partly incorporated in the circuit of the printhead 1726, a printhead and printing apparatus with higher performance can be implemented. As described above, with the arrangement of the printing apparatus having the printhead according to the present invention, various methods can be conceived on the basis of communications with the printing apparatus.

FIG. 19 is a view showing the third arrangement example of the printing apparatus using the printhead according to the present invention. In this example, communication between the connection portions 1723 and 1724 is performed by radio, and no substantial contact portion is provided except for the supply of power. As a means for achieving this arrangement, infrared communication or the like is available. More specifically, radio communication can be implemented by using infrared emitting and receiving elements as the connection portions 1723 and 1724. As described above, signal terminals can be integrated into one system by encoding all control signals for the printhead. A high-performance printing apparatus can be provided by using an existing infrared communication protocol or another radio communication protocol as this communication protocol.

As described above, the scheme of performing printing control on the basis of a communication protocol will greatly influence the forms of future printing apparatuses. More specifically, by encoding printing control signals, the substantial number of connection terminals between the printing apparatus body and the printhead can be reduced, and high-speed data transfer can be implemented. This makes it possible to reduce the communication load and further simplify the arrangement of the apparatus as a direct printer. Since communication protocols that define higher transfer rates have increased in number, the processing speed of a printing apparatus can be effectively increased by using this communication method.

In the above embodiments, droplets discharged from the printing head are ink droplets, and a liquid stored in the ink tank is ink. However, the liquid to be stored in the ink tank is not limited to ink. For example, a treatment solution to be discharged onto a printing medium so as to improve the fixing property or water resistance of a printed image or its image quality may be stored in the ink tank.

Each of the embodiments described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding nucleate boiling, to each of electrothermal transducers arranged in correspondence with a sheet or liquid channels holding a liquid (ink), heat energy is generated by the electrothermal transducer to effect film boiling on the heat acting surface of the printing head, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printing head, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printing head having a length corresponding to the width of a maximum printing medium which can be printed by the printer, either the arrangement which satisfies the full-line length by combining a plurality of printing heads as disclosed in the above specification or the arrangement as a single printing head obtained by forming printing heads integrally can be used.

In addition, not only an exchangeable chip type printing head, as described in the above embodiment, which can be electrically connected to the apparatus main unit and can receive an ink from the apparatus main unit upon being mounted on the apparatus main unit but also a cartridge type printing head in which an ink tank is integrally arranged on the printing head itself can be applicable to the present invention.

It is preferable to add recovery means for the printing head, preliminary auxiliary means, and the like provided as an arrangement of the printer of the present invention since the printing operation can be further stabilized. Examples of such means include, for the printing head, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printing head or by combining a plurality of printing heads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes. Furthermore, additional functions according to the above embodiments are realized by executing the program codes which are read by a computer. The present invention includes a case where an OS (operating system) or the like working on the computer performs a part or an entire process in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or function expansion unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. A printhead comprising:
   a plurality of printing elements for printing;
   a block selection circuit that outputs a selection signal for selecting a block comprising a plurality of printing elements;
   a printing control circuit which outputs a driving signal for selectively driving said printing elements, together with the selection signal, to each of said printing elements in correspondence with image data; and
   an input portion, which receives external image data to be input to said printing control circuit,
   wherein said input portion is adapted to receive the image data and block selection data input to said block selection circuit through common signal lines in a bus format of a plurality of bits from outside of the printhead.

2. The printhead according to claim 1, wherein said input portion is adapted to parallelly receive the image data over a plurality of signal lines.

3. The printhead according to claim 1, wherein said input portion is adapted to receive data in units of 4 bits.

4. The printhead according to claim 1, wherein said block selection circuit includes a decoder.

5. The printhead according to claim 1, wherein each of said printing elements performs printing using heat energy.

6. The printhead according to claim 1, wherein each of said printing elements performs printing by discharging ink.

7. The printhead according to claim 1, wherein said input portion is adapted to receive the image data and the block selection data in the same bus format.

8. The printhead according to claim 1, wherein said input portion includes a shift register for sequentially shifting the received image data with the same number of bits as the bus format.

9. A printhead comprising:
   a plurality of printing elements for printing;
   a block selection circuit that outputs a selection signal for selecting a block comprising a plurality of printing elements;
   a printing control circuit which outputs a driving signal for selectively driving said printing elements, together with the selection signal, to each of said printing elements in correspondence with image data; and
   an input portion, which receives external image data to be input to said printing control circuit,
   wherein said input portion is adapted to continuously receive the image data and data for setting a printing element driving time through common signal lines from outside of the printhead.

10. The printhead according to claim 9, wherein said input portion is adapted to receive data to be input to said block selection circuit together with the image data.

11. The printhead according to claim 9, wherein said input portion is adapted to continuously receive the image data and data to be input to said block selection circuit.

12. The printhead according to claim 9, wherein said block selection circuit includes a decoder.

13. The printhead according to claim 9, wherein each of said printing elements performs printing using heat energy.

14. The printhead according to claim 9, wherein each of said printing elements performs printing by discharging ink.

15. The printhead according to claim 9, wherein said input portion is adapted to receive the image data and the data for setting the printing element driving time in the same bus format.

16. A method of driving a printhead including a plurality of printing elements for printing, a block selection circuit for outputting a selection signal for selecting a block of a plurality of printing elements, a printing control circuit for outputting a driving signal for selectively driving the printing elements, together with the selection signal, to each of the printing elements in correspondence with image data, and input means for receiving external image data to be input to the printing control circuit, said method comprising the steps of:

causing the input means to receive the external image data and block selection data input to the block selection circuit through common signal lines in a bus format of a plurality of bits from outside of the printhead; and causing the printing control circuit to drive the printing elements of the block selected by the block selection circuit in correspondence with the image data.

17. The method according to claim 16, wherein said receiving step comprises parallelly receiving the image data over a plurality of signal lines.

18. The method according to claim 16, wherein said receiving step comprises receiving data in units of 4 bits.

19. The method according to claim 16, wherein the input means receives the image data and the block selection data in the same bus format.

20. A method of driving a printhead including a plurality of printing elements for printing, a block selection circuit for outputting a selection signal for selecting a block of a plurality of printing elements, a printing control circuit for outputting a driving signal for selectively driving the printing elements, together with the selection signal, to each of the printing elements in correspondence with image data, and input means for receiving external image data to be input to the printing control circuit, said method comprising the steps of:

causing the input means to receive data for setting a printing element driving time continuously with the image data through the same signal lines as the image data from outside of the printhead; and causing the printing control circuit to drive the printing elements of the block selected by the block selection circuit in correspondence with the image data.

21. The method according to claim 20, wherein said receiving step comprises receiving data input to the block selection circuit together with the image data.

22. The method according to claim 20, wherein said receiving step comprises continuously receiving the image data and data to be input to the block selection circuit.

23. The method according to claim 20, wherein the input means receives the image data and the data for setting the printing element driving time in the same bus format.

24. A data output apparatus for outputting image data and a block selection signal to an input portion of a printhead, the printhead including (i) a plurality of printing elements for printing, (ii) a block selection circuit for outputting the selection signal for selecting a block of a plurality of printing elements, (iii) a printing control circuit for outputting a driving signal for selectively driving the printing elements together with the selection signal to each of the printing elements in correspondence with the image data, and (iv) the input portion, which receives external image data to be input to the printing control circuit, said apparatus comprising:

an output unit that outputs the image data and block selection data input to the block selection circuit to the printhead through common signal lines in a bus format of a plurality of bits.

25. The apparatus according to claim 24, wherein the image data is parallelly output to the input portion over a plurality of signal lines.

26. The apparatus according to claim 24, wherein data is output to the input portion in units of 4 bits.

27. The apparatus according to claim 24, wherein each of the printing elements performs printing by discharging ink using heat energy.

28. The apparatus according to claim 24, wherein said output unit outputs the image data and the block selection data in the same bus format.

29. A data output apparatus for outputting image data to an input portion of a printhead, the printhead including (i) a plurality of printing elements for printing, (ii) a block selection circuit for outputting a selection signal for selecting a block of a plurality of printing elements, (iii) a printing control circuit for outputting a driving signal for selectively driving the printing elements in the block, the printing control circuit adapted to output the driving signal together with the selection signal to each of the printing elements in correspondence with the image data, and (iv) the input portion, which receives external image data to be input to the printing control circuit, wherein said data output apparatus continuously outputs the image data and data for setting a printing element driving time to the printhead through common signal lines.

30. The apparatus according to claim 29, wherein data supplied to the block selection circuit is output to the input portion, together with the image data.

31. The apparatus according to claim 29, wherein the image data and data supplied to the block selection circuit are continuously output to the input portion.

32. The apparatus according to claim 29, wherein each of the printing elements performs printing by discharging ink using heat energy.

33. The apparatus according to claim 29, wherein the image data and the data for setting the printing element driving time are output in the same bus format.

* * * * *

UNITED STATES PATENT AND TRADEMARK OFFICE
CERTIFICATE OF CORRECTION

PATENT NO. : 6,830,301 B2
DATED : December 14, 2004
INVENTOR(S) : Hayasaki

It is certified that error appears in the above-identified patent and that said Letters Patent is hereby corrected as shown below:

Column 1,
Line 26, "down," should read -- reductions, --.
Line 43, "ten" should read -- tens of --.
Line 60, "are interefered" should read -- interfere --.

Column 3,
Line 10, "with" should read -- width --.

Column 15,
Line 1, "from" should read -- form --.
Line 53, "above" should read -- above will be described --.

Column 19,
Line 61, "or" should read -- of or --.

Column 20,
Line 3, "or" should read -- of or an --.

Signed and Sealed this

Twenty-eighth Day of June, 2005

JON W. DUDAS
*Director of the United States Patent and Trademark Office*